US012513967B2

(12) United States Patent
Jeon et al.

(10) Patent No.: US 12,513,967 B2
(45) Date of Patent: Dec. 30, 2025

(54) SEMICONDUCTOR DEVICE, NONVOLATILE MEMORY DEVICE INCLUDING THE SAME, AND ELECTRONIC SYSTEM INCLUDING THE SAME

(71) Applicant: SAMSUNG ELECTRONICS CO., LTD., Suwon-si (KR)

(72) Inventors: Young-Joo Jeon, Seoul (KR); Byung Joo Go, Hwaseong-si (KR); Hee-Sung Kam, Anyang-si (KR); Su Jin Park, Gwangmyeong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 672 days.

(21) Appl. No.: 17/968,037

(22) Filed: Oct. 18, 2022

(65) Prior Publication Data

US 2023/0207644 A1   Jun. 29, 2023

(30) Foreign Application Priority Data

Dec. 23, 2021   (KR) .................. 10-2021-0185624

(51) Int. Cl.
*H10D 64/23* (2025.01)
*G11C 16/04* (2006.01)
(Continued)

(52) U.S. Cl.
CPC ....... *H10D 64/258* (2025.01); *G11C 16/0483* (2013.01); *G11C 16/16* (2013.01);
(Continued)

(58) Field of Classification Search
CPC ...... H10D 64/258; H10B 41/10; H10B 43/35; H10B 41/35; H10B 43/40; H10B 43/10;
(Continued)

(56) References Cited

U.S. PATENT DOCUMENTS 6,365,453 B1   4/2002   Deboer et al.
9,620,602 B2   4/2017   Watanabe et al.
(Continued)

FOREIGN PATENT DOCUMENTS

KR   10-2009-0081119   7/2009
KR   10-2018-0101698   9/2018
(Continued)

OTHER PUBLICATIONS

Office Action dated Jul. 24, 2025 issued in the corresponding Korean Patent Application No. 10-2021-0185624.

*Primary Examiner* — Richard A Booth
(74) *Attorney, Agent, or Firm* — MORGAN, LEWIS & BOCKIUS LLP

(57) ABSTRACT

A semiconductor device includes: a substrate includes an active area; a gate structure intersecting the active area; a source/drain area disposed on the active area; a lower contact disposed on the source/drain area or the gate structure; an upper contact disposed on the lower contact; and a plurality of conductive lines disposed on the upper contact, wherein the plurality of conductive lines extend in a first direction parallel to an upper surface of the substrate, wherein the plurality of conductive lines includes a first conductive line disposed on the upper contact, wherein a size in the first direction of the lower contact is smaller than a size in the first direction of the upper contact, wherein a size in a second direction of the lower contact is greater than a size in the second direction of the upper contact, wherein the second direction intersects the first direction.

20 Claims, 21 Drawing Sheets

(51) Int. Cl.
   *G11C 16/16* (2006.01)
   *G11C 16/26* (2006.01)
   *H01L 23/522* (2006.01)
   *H01L 23/528* (2006.01)
   *H10B 41/10* (2023.01)
   *H10B 41/35* (2023.01)
   *H10B 41/41* (2023.01)
   *H10B 43/10* (2023.01)
   *H10B 43/35* (2023.01)
   *H10B 43/40* (2023.01)

(52) U.S. Cl.
   CPC .......... *G11C 16/26* (2013.01); *H01L 23/5226* (2013.01); *H01L 23/5283* (2013.01); *H10B 41/10* (2023.02); *H10B 41/35* (2023.02); *H10B 41/41* (2023.02); *H10B 43/10* (2023.02); *H10B 43/35* (2023.02); *H10B 43/40* (2023.02)

(58) Field of Classification Search
   CPC . H10B 41/41; H01L 23/5226; H01L 23/5283; G11C 16/0483; G11C 16/16; G11C 16/26
   See application file for complete search history.

(56) References Cited

U.S. PATENT DOCUMENTS

| | | | |
|---|---|---|---|
| 10,373,653 B2* | 8/2019 | Lee | G11C 13/00 |
| 2010/0195395 A1* | 8/2010 | Jeong | H10B 43/27 |
| | | | 365/185.17 |
| 2020/0035605 A1 | 1/2020 | Tsai et al. | |
| 2020/0258911 A1* | 8/2020 | Lim | G11C 16/08 |

FOREIGN PATENT DOCUMENTS

| | | |
|---|---|---|
| KR | 10-2020-0000720 | 1/2020 |
| KR | 10-2020-0065617 | 6/2020 |
| KR | 10-2021-0013447 | 2/2021 |
| KR | 10-2021-0067839 | 6/2021 |
| KR | 10-2021-0090768 | 7/2021 |

\* cited by examiner

SEMICONDUCTOR DEVICE, NONVOLATILE MEMORY DEVICE INCLUDING THE SAME, AND ELECTRONIC SYSTEM INCLUDING THE SAME

CROSS-REFERENCE TO RELATED APPLICATION

This application claims priority under 35 U.S.C. 119(a) to Korean Patent Application No. 10-2021-0185624, filed on Dec. 23, 2021, in the Korean Intellectual Property Office, the disclosure of which is incorporated by reference herein in its entirety.

TECHNICAL FIELD

The present inventive concept relates to a semiconductor device, a non-volatile memory device including the same, and an electronic system including the same. More particularly, the present inventive concept relates to a semiconductor device including a fine line pattern, a non-volatile memory device including the semiconductor device, and an electronic system including the semiconductor device.

DISCUSSION OF THE RELATED ART

As an electronic product becomes lighter, thinner and smaller, demand for increased integration of a semiconductor device is increasing. As the semiconductor device is increasingly integrated, sizes of components included in the semiconductor device (e.g., a transistor) decrease, and thus, a leakage current may occur. Accordingly, there is a desire to control the leakage current of the semiconductor device to increase performance and reliability of the semiconductor device.

In an electronic system that uses data storage, a semiconductor device capable of storing high-capacity data may be desirable. Accordingly, a scheme for increasing the data storage capacity of the semiconductor device is currently under development. For example, a non-volatile memory device including three-dimensionally arranged memory cells instead of two-dimensionally arranged memory cells has been proposed as one of the schemes for increasing the data storage capacity of the semiconductor device.

SUMMARY

According to an exemplary embodiment of the present inventive concept, a semiconductor device may be provided with a reduced chip size.

According to an exemplary embodiment of the present inventive concept, a non-volatile memory device including a semiconductor device in which a chip size may be reduced.

According to an exemplary embodiment of the present inventive concept, an electronic system including a semiconductor in which a chip size may be reduced.

According to an exemplary embodiment of the present inventive concept, a semiconductor device includes: a substrate includes an active area formed therein; a gate structure disposed on the substrate and intersecting the active area; a source/drain area disposed on the active area and on a side surface of the gate structure; a first lower contact disposed on one of the source/drain area or the gate structure; a first upper contact disposed on the first lower contact; and a plurality of conductive lines disposed on the first upper contact, wherein the plurality of conductive lines extend in a first direction parallel to an upper surface of the substrate, wherein the plurality of conductive lines includes a first conductive line disposed on the first upper contact, wherein a size in the first direction of the first lower contact is smaller than a size in the first direction of the first upper contact, wherein a size in a second direction of the first lower contact is greater than a size in the second direction of the first upper contact, wherein the second direction is parallel to the upper surface of the substrate and intersects the first direction.

According to an exemplary embodiment of the present inventive concept, a non-volatile memory device includes: a cell substrate; a plurality of word-lines disposed on the cell substrate, spaced apart from each other, and sequentially stacked on the cell substrate; a plurality of channel structures disposed on the cell substrate and intersecting the plurality of word-lines; a plurality of bit-lines connected to at least one of the plurality of channel structures; and a page buffer circuit disposed on a peripheral circuit substrate and electrically connected to the plurality of bit-lines, wherein the page buffer circuit includes: a transistor structure disposed on the peripheral circuit substrate; a lower contact in contact with the transistor structure; an upper contact disposed on the lower contact; and a plurality of conductive lines disposed on the upper contact, wherein the plurality of conductive lines extend in a first direction parallel to an upper surface of the substrate, and are connected the plurality of bit-lines, wherein at least one of the plurality of conductive lines is in contact with the upper contact, wherein a size in the first direction of the lower contact is smaller than a size in the first direction of the upper contact, wherein a size in a second direction of the lower contact is greater than a size in the second direction of the upper contact, wherein the second direction is parallel to the upper surface of the substrate and intersects the first direction.

According to an exemplary embodiment of the present inventive concept, an electronic system includes: a main substrate; a non-volatile memory device disposed on the main substrate; and a controller disposed on the main substrate and electrically connected to the non-volatile memory device, wherein the non-volatile memory device includes: a plurality of memory cell strings; a bit-line connected to at least one of the plurality of memory cell strings; and a page buffer circuit electrically connected to the bit-line, wherein the controller is configured to control the page buffer circuit, wherein the page buffer circuit includes: a transistor structure; a first contact in contact with the transistor structure; a second contact disposed on the first contact; and a conductive line disposed on the second contact and extending in a first direction parallel to an upper surface of the substrate, wherein the conductive line is electrically connected to the bit-line, wherein a size in the first direction of the first contact is smaller than a size in the first direction of the second contact, wherein a size in a second direction of the first contact is greater than a size in the second direction of the second contact, wherein the second direction is parallel to the upper surface of the substrate and intersects the first direction.

BRIEF DESCRIPTION OF DRAWINGS

The above features of the present inventive concept will become more apparent by describing in detail embodiments thereof with reference to the attached drawings, in which.

DETAILED DESCRIPTION OF THE EMBODIMENTS

Figure 1:
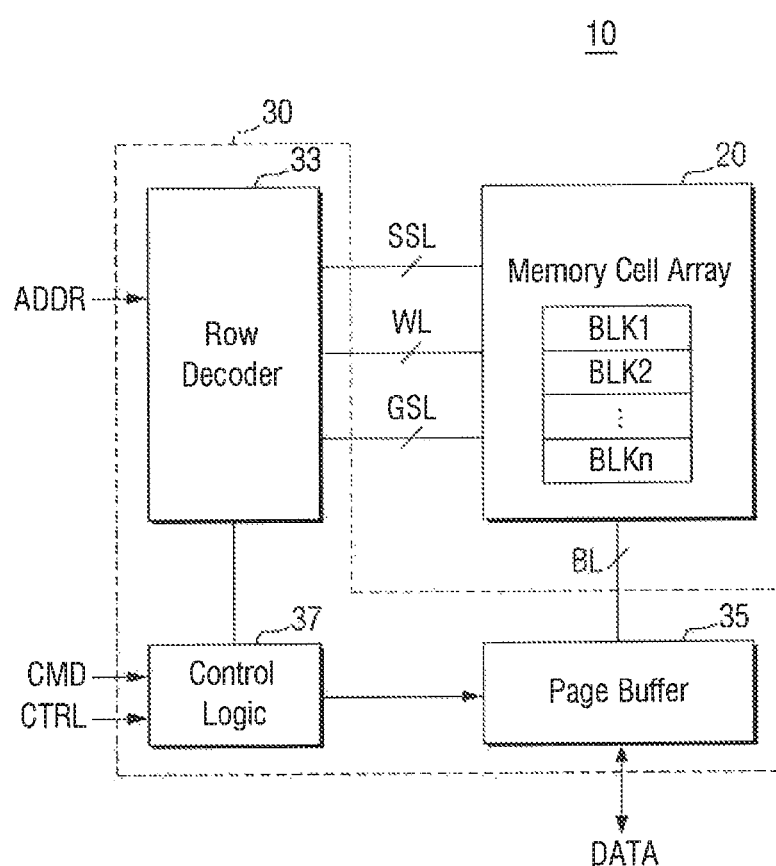
FIG. 1 is a block diagram for illustrating a non-volatile memory device including a semiconductor device according to an exemplary embodiment of the present inventive concept.

For simplicity and clarity of illustration, elements in the drawings are not necessarily drawn to scale. The same reference numbers in different drawings represent the same or similar elements, and as such perform similar or the same functionality. Further, descriptions and details of well-known steps and elements are omitted for simplicity of the description. Various exemplary embodiments of the present inventive concept are illustrated and described further below. It will be understood that the description herein is not intended to limit the claims to the specific embodiments described. On the contrary, it is intended to cover alternatives, modifications, and equivalents as may be included within the spirit and scope of the present inventive concept as defined by the appended claims.

A shape, a size, a ratio, an angle, a number, etc. disclosed in the drawings for illustrating exemplary embodiments of the present inventive concept are merely examples, and the present inventive concept is not limited thereto.

" " " " " " " " " " " " " " " It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present inventive concept.

In addition, it will be understood that when a first element or layer is referred to as being present "on" or "beneath" a second element or layer, the first element may be disposed directly on or beneath the second element or may be disposed indirectly on or beneath the second element with a third element or layer being disposed between and connected to the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will be understood that when an element or layer is referred to as being "between" two elements or layers, it may be the only element or layer between the two elements or layers, or one or more intervening elements or layers may also be present.

Further, as used herein, when a layer, film, region, plate, or the like may be disposed "on" or "on a top" of another layer, film, region, plate, or the like, the former may directly contact the latter or still another layer, film, region, plate, or the like may be disposed between and connected to the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between and connected to the former and the latter. Further, as used herein, when a layer, film, region, plate, or the like may be disposed "below" or "under" another layer, film, region, plate, or the like, the former may directly contact the latter or still another layer, film, region, plate, or the like may be disposed between and connected to the former and the latter. As used herein, when a layer, film, region, plate, or the like is directly disposed "below" or "under" another layer, film, region, plate, or the like, the former directly contacts the latter and still another layer, film, region, plate, or the like is not disposed between and connected to the former and the latter.

For example, exemplary embodiments of the present inventive concept may be implemented differently. For example, a function or operation specified in a specific block may occur in a sequence different from that specified in a flowchart. For example, two consecutive blocks may be actually executed at the same time. As another example, depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is indicated. The features of the various embodiments of the present inventive concept may be partially or entirely combined with each other, and may be technically associated with each other or operate with each other. The exemplary embodiments of the present inventive concept may be implemented independently of each other and may be implemented together in an association relationship.

Spatially relative terms, such as "beneath," "below," "lower," "under," "above," "upper," and the like, may be used herein for ease of explanation for illustrating one element or feature's relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented, for example, rotated 90 degrees or at other orientations, and the spatially relative descriptors used herein should be interpreted accordingly.

Terms as used herein "first direction Y", "second direction X" and "third direction Z" should not be interpreted only to have a geometric relationship in which the first direction, the second direction, and the third direction are perpendicular to each other. The "first direction Y", "second direction X" and "third direction Z" may be interpreted to have a broader direction within a range in which components herein may work functionally.

Hereinafter, exemplary embodiments of the present inventive concept will be described in detail with reference to the accompanying drawings. The same reference numerals are used for the same components in the drawings, and duplicate descriptions thereof may be omitted.

Hereinafter, a semiconductor device according to exemplary embodiments of the present inventive concept will be described with reference to FIGS. 1 to 13.

The semiconductor device as described below is mainly described based on a NAND flash memory device including the same. However, this is only an example. In another example, the semiconductor device according to an exemplary embodiment of the present inventive concept may be included in another non-volatile memory device such as a phase-change random access memory (PRAM), a magnetoresistive random access memory (MRAM), a ferroelectric random access memory (FeRAM), or a resistive random access memory (RRAM); a volatile memory devices such as a dynamic random access memory (DRAM) or a static random access memory (SRAM); or a logic element such as a central processing unit (CPU), a graphic processing unit (GPU), a controller, an application specific integrated circuit (ASIC), or an application processor (AP).

FIG. 1 is an exemplary block diagram for illustrating a non-volatile memory device including a semiconductor device according to an exemplary embodiment of the present inventive concept.

Referring to FIG. 1, a non-volatile memory device 10 including a semiconductor device according to an exemplary embodiment of the present inventive concept includes a memory cell array 20 and a peripheral circuit 30.

The memory cell array 20 may include a plurality of memory cell blocks (BLK1 to BLKn). Each of the memory cell blocks BLK1 to BLKn may include a plurality of memory cells. The memory cell array 20 may be connected to the peripheral circuit 30 via a bit-line BL, a word-line WL, at least one string select line SSL, and at least one ground select line GSL. For example, the memory cell blocks BLK1 to BLKn may be connected to a row decoder circuit 33 via the word-line WL, the string select line SSL, and the ground select line GSL. Further, the memory cell blocks BLK1 to BLKn may be connected to a page buffer circuit 35 via the bit-line BL.

The peripheral circuit 30 may receive an address ADDR, a command CMD, and a control signal CTRL from an external device, and may transmit and receive data to and from an external device. The peripheral circuit 30 may include a control logic circuit 37, the row decoder circuit 33, and the page buffer circuit 35. The peripheral circuit 30 may further include various sub-circuits such as an input/output circuit, a voltage generation circuit for generating various voltages required for an operation of the non-volatile memory device 10, and an error correction circuit for correcting an error of the data DATA read from the memory cell array 20.

The control logic circuit 37 may be connected to the row decoder circuit 33, the input/output circuit, and the voltage generation circuit. The control logic circuit 37 may control overall operations of the non-volatile memory device 10. The control logic circuit 37 may generate various internal control signals used in the non-volatile memory device 10 in response to the control signal CTRL. For example, the control logic circuit 37 may adjust a voltage level of a voltage supplied to the word-line WL and the bit-line BL when performing a memory operation such as a program operation or an erase operation.

The row decoder circuit 33 may select at least one of the plurality of memory cell blocks BLK1 to BLKn in response to the address ADDR, and may select at least one word-line WL, at least one string select line SSL, and at least one ground select line GSL of the selected at least one memory cell block BLK1 to BLKn. Further, the row decoder circuit 33 may transmit a voltage for performing a memory operation to the word-line WL of the selected at least one memory cell block BLK1 to BLKn.

The page buffer circuit 35 may be connected to the memory cell array 20 via the bit-line BL. The page buffer circuit 35 may operate as a writer driver or a sense amplifier. For example, when performing a program operation, the page buffer circuit 35 operates as the writer driver to apply a voltage based on the data DATA to be stored in the memory cell array 20 to the bit-line BL. In addition, when performing a read operation, the page buffer circuit 35 may operate as the sense amplifier to detect the data DATA stored in the memory cell array 20.

Figure 2:
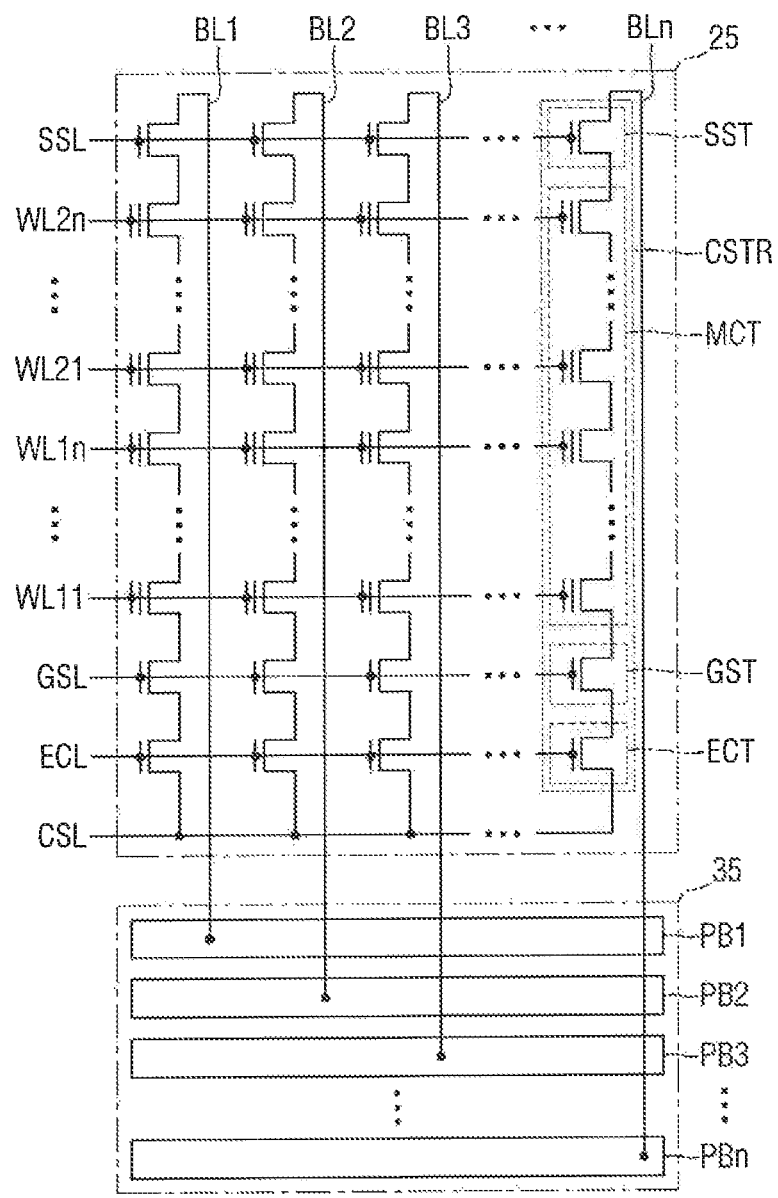
FIG. 2 is a circuit diagram for illustrating a non-volatile memory device including a semiconductor device according to an exemplary embodiment of the present inventive concept.

FIG. 2 is a circuit diagram for illustrating a non-volatile memory device including a semiconductor device according to an exemplary embodiment of the present inventive concept.

Referring to FIG. 2, the memory cell array (e.g., 20 in FIG. 1) of a non-volatile memory device including a semiconductor device according to an exemplary embodiment of the present inventive concept may include a memory cell block 25 and the page buffer circuit 35.

A plurality of memory cell blocks 25 may constitute the memory cell array (e.g., 20 in FIG. 1) of the non-volatile memory device. Each of the memory cell blocks 25 may include a plurality of cell strings CSTR. Each of the cell strings CSTR may be disposed at a point where each of a plurality of word-lines WL11 to WL2n and each of a plurality of bit-lines BL1 to BLn intersect each other. Further, the cell strings CSTR may be commonly connected to a common source line CSL. Each of the cell strings CSTR may be disposed between and connected to each of the bit-lines BL1 to BLn and the common source line CSL.

Each cell string CSTR may include a ground select transistor GST connected to the common source line CSL, a string select transistor SST connected to the bit-lines BL1 to BLn, and a plurality of memory cell transistors MCT disposed between and connected to the ground select transistor GST and the string select transistors SST. The ground select transistor GST, the string select transistor SST, and the memory cell transistors MCT may be connected in series to each other. Each of the memory cell transistors MCT may include a data storage element.

The common source line CSL may be commonly connected to sources of the ground select transistors GST. Further, a ground select line GSL, a plurality of word-lines WL11 to WL2n and a string select line SSL may be disposed between and connected to the common source line CSL and the bit-lines BL1 to BLn. The ground select line GSL may act as a gate electrode of the ground select transistor GST. The word-lines WL11 to WL2n may respectively act as gate electrodes of the memory cell transistors MCT, and the string select line SSL may act as a gate electrode of the string select transistor SST.

In an exemplary embodiment of the present inventive concept, an erase control transistor ECT may be disposed between and connected to the common source line CSL and the ground select transistor GST. The common source line CSL may be commonly connected to sources of erase control transistors ECT. Further, an erase control line ECL may be disposed between and connected to the common source line CSL and the ground select line GSL. The erase control line ECL may act as a gate electrode of the erase control transistor ECT. The erase control transistors ECT may generate gate induced drain leakage (GIDL) to perform the erase operation of the memory cell array.

The page buffer circuit 35 may include a plurality of page buffers PB1 to PBn respectively corresponding to the bit-lines BL1 to BLn. For example, when the memory cell block 25 includes n bit-lines BL1 to BLn, the page buffer circuit 35 may include n page buffers PB1 to PBn. Each of the page buffers PB1 to PBn may be connected to each of the bit-lines BL1 to BLn in a corresponding manner thereto. The plurality of page buffers PB1 to PBn, which connected to one memory cell block 25, may be arranged along a predefined direction (e.g., a direction in which each of the bit-lines BL1 to BLn extends).

Each of the page buffers PB1 to PBn may temporarily store therein data to be stored or read through each of the bit-lines BL1 to BLn. For example, each of the page buffers PB1 to PBn may include at least one latch circuit for temporarily storing the data therein. Further, each of the page buffers PB1 to PBn may further include a connection circuit for connecting the bit-lines BL1 to BLn to the latch circuit, a pre-charge circuit for pre-charging a sensing node to store or read-out the data, etc. The semiconductor device according to an exemplary embodiment of the present inventive concept may be configured to implement the circuits of each of the page buffers PB1 to PBn.

Figure 3:
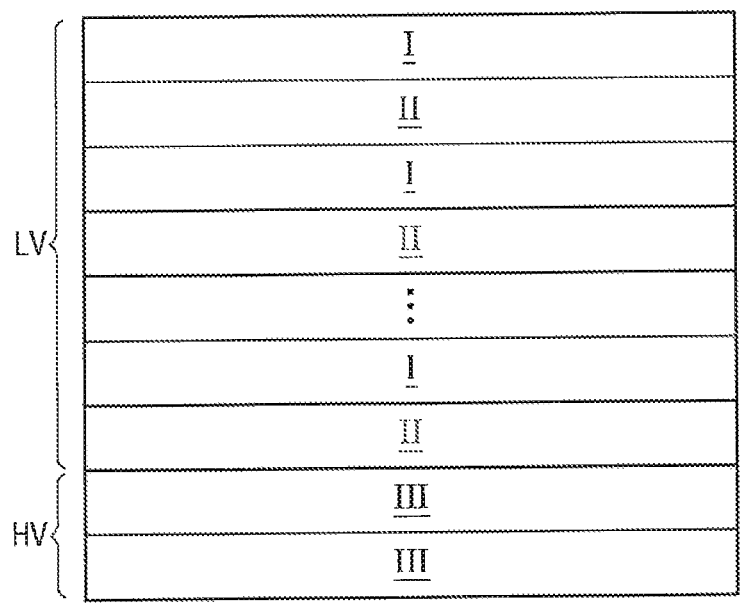
FIG. 3 is a block diagram for illustrating a page buffer of a non-volatile memory device including a semiconductor device according to an exemplary embodiment of the present inventive concept.
Figure 3:
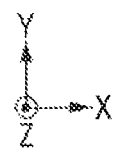

FIG. 3 is a block diagram for illustrating a page buffer of a non-volatile memory device including a semiconductor device according to an exemplary embodiment of the present inventive concept.

Referring to FIG. 3, a non-volatile memory device including a semiconductor device according to an exemplary embodiment of the present inventive concept may include a page buffer PB.

A plurality of page buffers PB may constitute a page buffer circuit (e.g., 35 in FIG. 2) of the non-volatile memory device. For example, the page buffer PB may correspond to each of the page buffers PB1 to PBn in FIG. 2. The page buffer PB may include a plurality of semiconductor elements (e.g., transistors) for providing the latch circuit, the connection circuit, and/or the pre-charge circuit.

The page buffer PB may include a low-voltage area LV and a high-voltage area HV. Low-voltage transistors operating based on a relatively low-voltage may be disposed in the low-voltage area LV, while high-voltage transistors operating based on a relatively high-voltage may be disposed in the high-voltage area HV. The low-voltage area LV and the high-voltage area HV may be arranged along a predefined direction (e.g., a first direction Y). In an exemplary embodiment of the present inventive concept, the first direction Y may be a direction in which each of the bit-lines (e.g., BL1 to BLn in FIG. 2) of the non-volatile memory device extends.

In an exemplary embodiment of the present inventive concept, the low-voltage area LV may include a plurality of first areas I and a plurality of second areas II. The first areas I and the second areas II may be alternately arranged with each other along the first direction Y. Semiconductor elements of different conductivity types may be respectively disposed in the first area I and the second area II. In one example, n-type transistors (e.g., NMOS) may be disposed in the first area I, and p-type transistors (e.g., NMOS) may be disposed in the second area II. However, the present inventive concept is not limited thereto.

In an exemplary embodiment of the present inventive concept, the high-voltage area HV may include a plurality of third areas (III) arranged along the first direction Y. In the third area III, semiconductor elements of a predefined conductivity type may be disposed. In one example, n-type transistors (e.g., NMOS) may be disposed in the third area III. However, the present inventive concept is not limited thereto.

Figure 4:
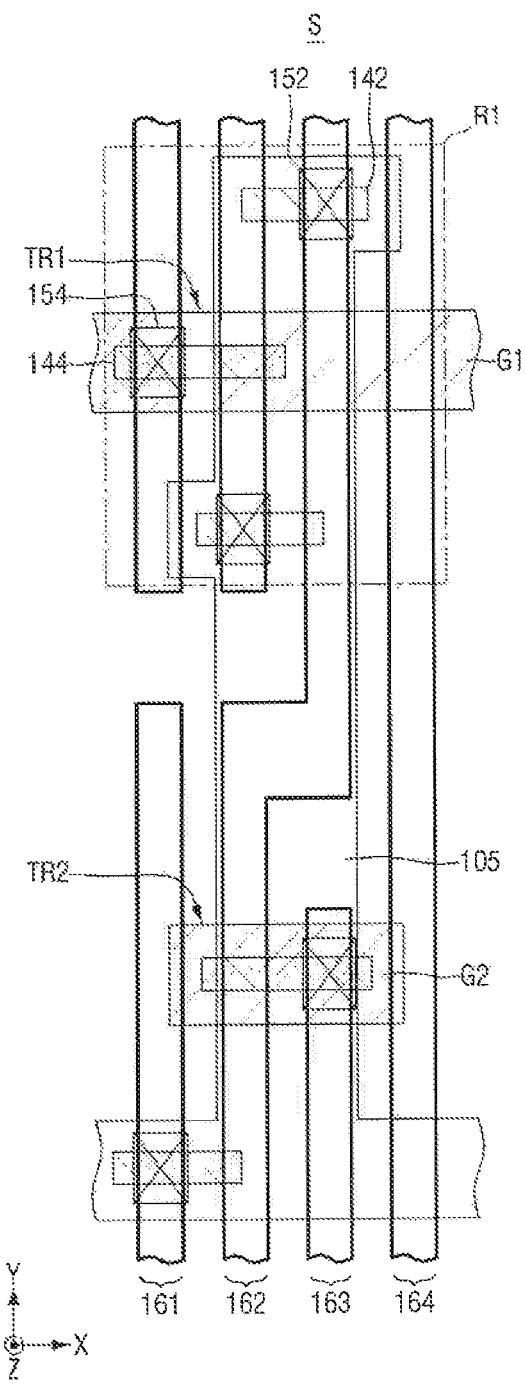
FIG. 4 is a layout diagram for illustrating a page buffer of a non-volatile memory device including a semiconductor device according to an exemplary embodiment of the present inventive concept.
Figure 5:
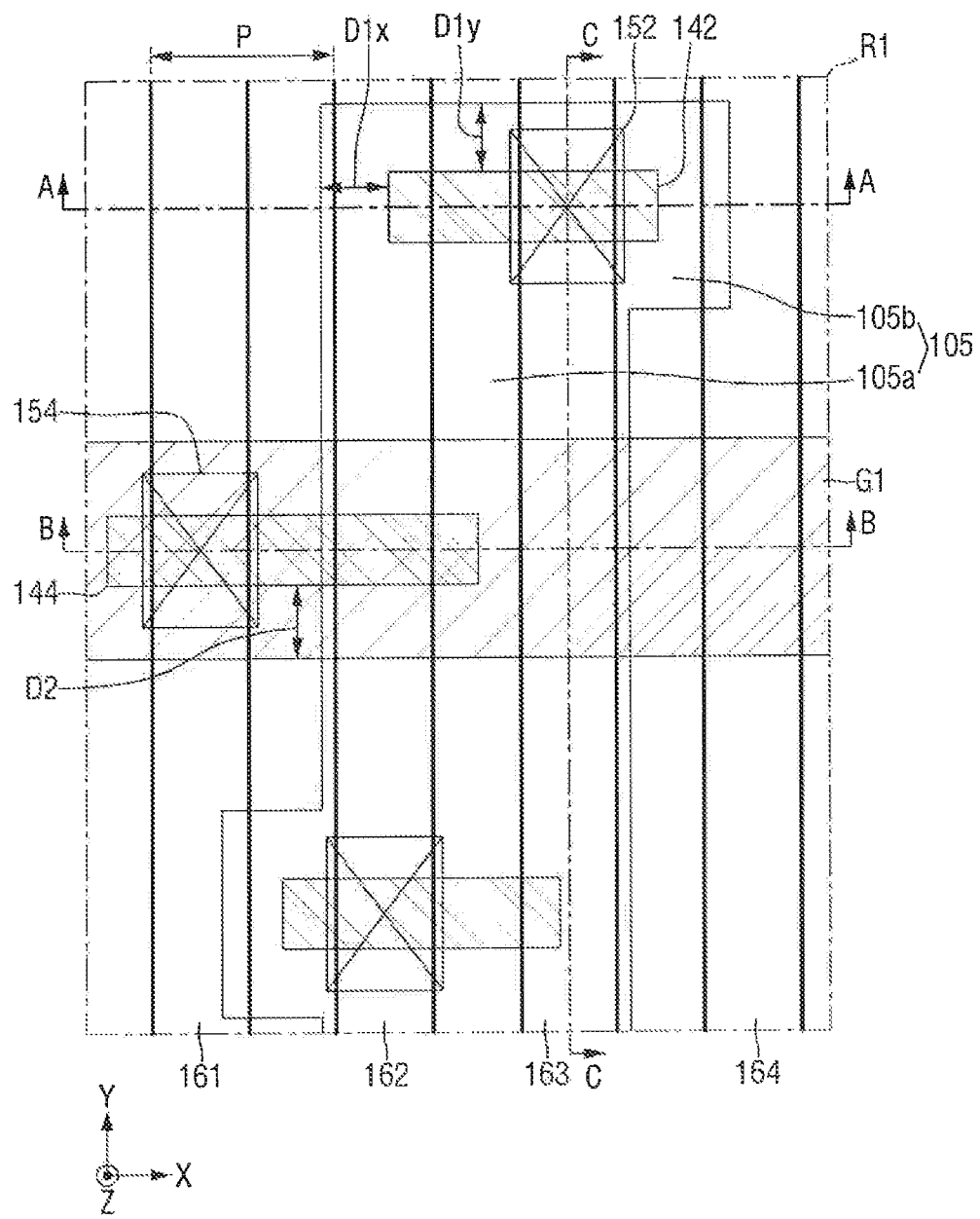
FIG. 5 is an enlarged view to illustrate a R1 area of FIG. 4.
Figure 6:
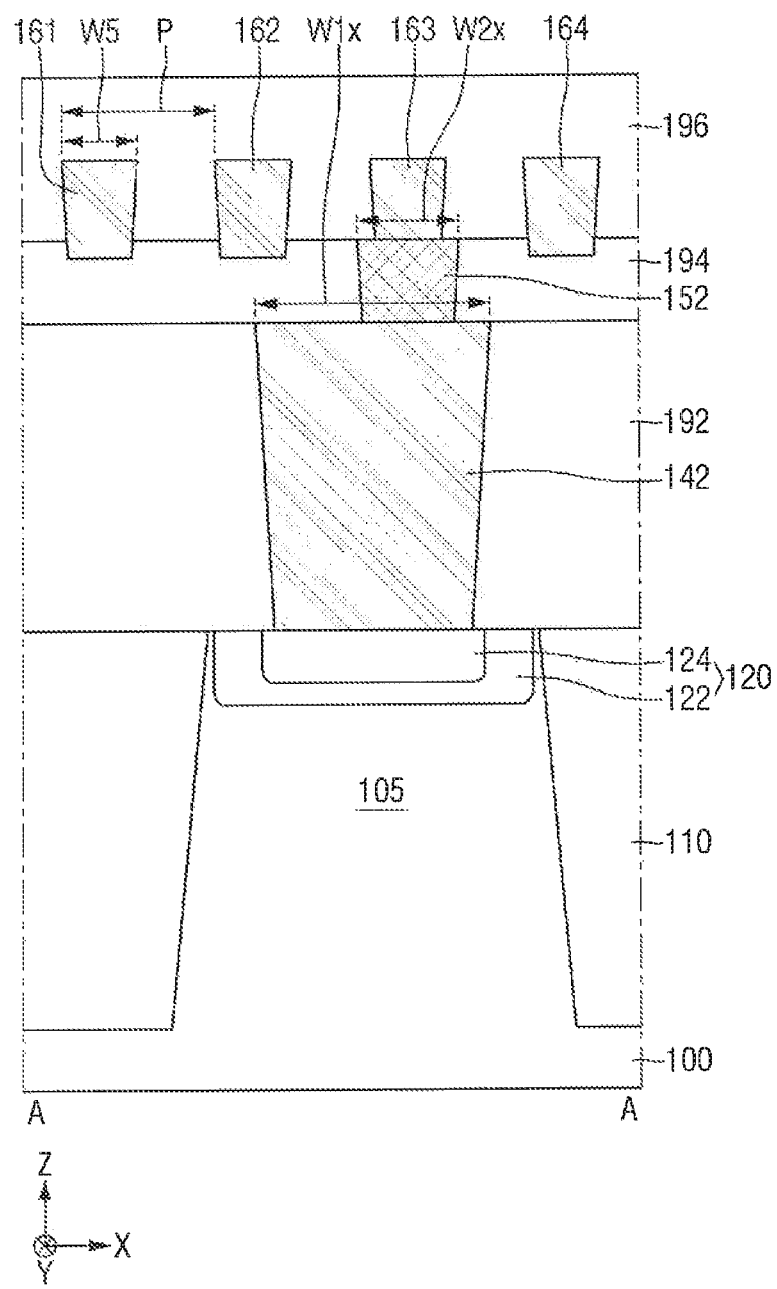
FIG. 6 is a schematic cross-sectional view taken along A-A of FIG. 5.
Figure 7:
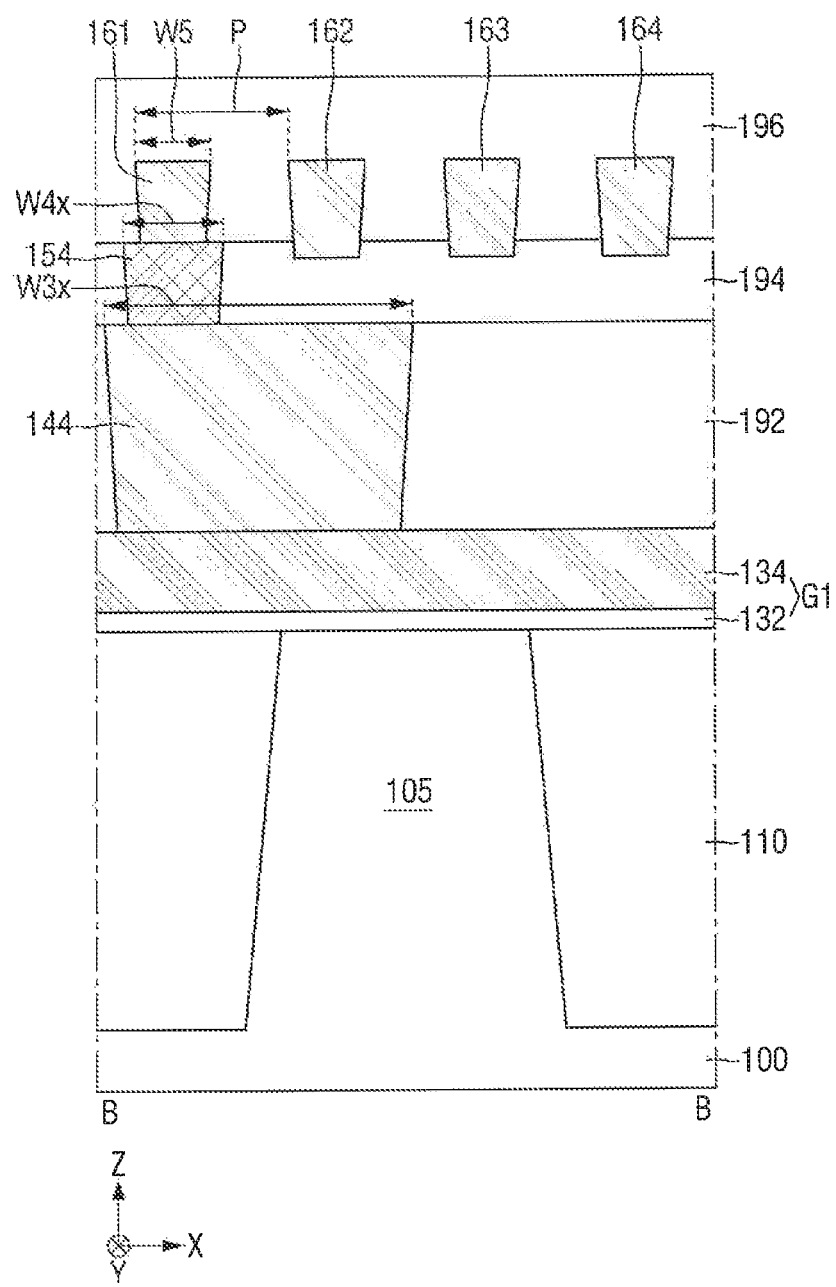
FIG. 7 is a schematic cross-sectional view taken along B-B of FIG. 5.
Figure 8:
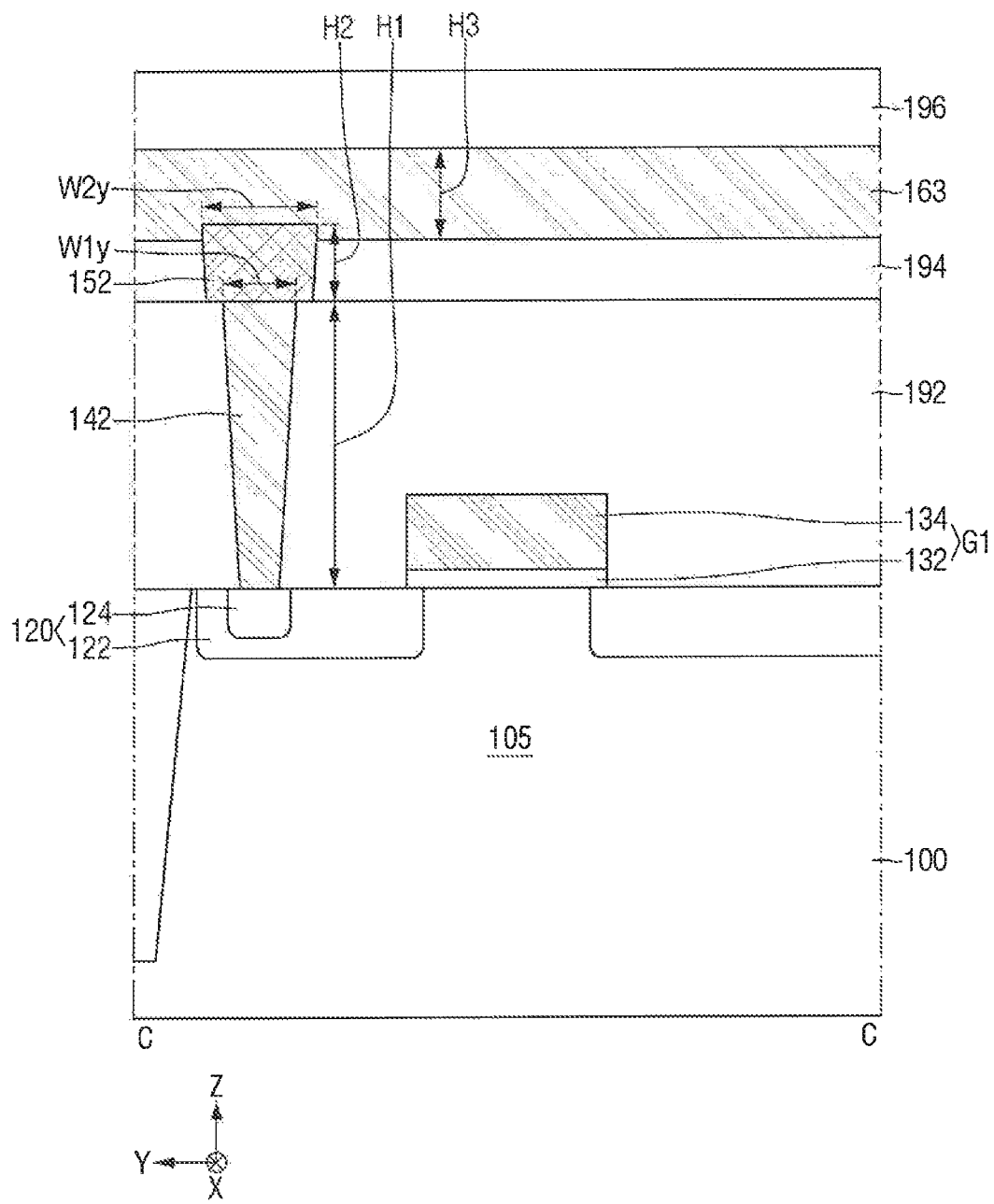
FIG. 8 is a schematic cross-sectional view taken along C-C of FIG. 5.

FIG. 4 is a layout diagram for illustrating a page buffer of a non-volatile memory device including a semiconductor device according to an exemplary embodiment of the present inventive concept. FIG. 5 is an enlarged view to illustrate a R1 area of FIG. 4. FIG. 6 is a schematic cross-sectional view taken along A-A of FIG. 5. FIG. 7 is a schematic cross-sectional view taken along B-B of FIG. 5. FIG. 8 is a schematic cross-sectional view taken along C-C of FIG. 5.

Referring to FIG. 4 to FIG. 8, the semiconductor device according to an exemplary embodiment of the present inventive concept may include transistors TR1 and TR2, lower contacts 142 and 144, upper contacts 152 and 154, and conductive lines 161 to 164. For convenience of illustration, elements and/or components already described above with reference to FIGS. 1 to 3 may be briefly described or omitted.

The semiconductor device according to an exemplary embodiment of the present inventive concept may be disposed in one area S of the page buffer circuit (e.g., 35 of FIG. 2) of the non-volatile memory device. For example, one area S may be a partial area of the page buffer PB in FIG. 3. One area S may be a partial area of the low-voltage area LV or the high-voltage area HV. One area S may be a portion of the first area I, may be a portion of the second area II, or may be a portion of the third area III.

The transistors TR1 and TR2 may be formed on a first substrate 100. The first substrate 100 may include a base substrate and an epitaxial layer grown on the base substrate. However, the present inventive concept is not limited thereto. For example, the first substrate 100 may include only the base substrate and may be free of the epitaxial layer. The first substrate 100 may be embodied as, for example, a silicon substrate, a gallium arsenide substrate, a silicon germanium substrate, a ceramic substrate, a quartz substrate, or a glass substrate for a display, or may be embodied as a SOI (Semiconductor On Insulator) substrate. Hereinafter, by way of example, an example in which the first substrate 100 is embodied as a silicon substrate is described.

In an exemplary embodiment of the present inventive concept, the first substrate 100 may have a first conductivity type. In one example, when each of the transistors TR1 and TR2 formed on the first substrate 100 is embodied as a n-type transistor, the first substrate 100 may include p-type impurity. The p-type impurity may include, for example, boron (B) or aluminum (Al). However, the present inventive concept is not limited thereto. The first substrate 100 may include a well doped with the impurities of the first conductivity type.

An active area 105 may be defined in the first substrate 100. The active area 105 may be an element isolation pattern 110 formed in the first substrate 100. For example, the element isolation pattern 110 may be formed by embedding an insulating material in a shallow trench formed by patterning the first substrate 100. The element isolation pattern 110 may include, for example, at least one of silicon oxide, silicon nitride, silicon oxynitride, and combinations thereof. However, the present inventive concept is not limited thereto.

The transistors TR1 and TR2 may be implemented on the active area 105 of the first substrate 100. In one example, the transistors TR1 and TR2 may include the first transistor TR1 and the second transistor TR2 implemented on the active area 105. The first transistor TR1 and the second transistor TR2 may be arranged along the first direction Y and may be disposed in one area S. For example, the active area 105 may generally have a shape extending in an elongate manner in the first direction Y and in a parallel manner to an upper surface of the first substrate 100. The first transistor TR1 may be implemented on a portion of the active area 105, while the second transistor TR2 may be implemented on another portion of the active area 105 spaced apart from the first transistor TR1 in the first direction Y.

The first transistor TR1 may include a first gate structure G1. The first gate structure G1 may intersect the active area 105. For example, the first gate structure G1 may extend in a second direction X intersecting the first direction Y and in a parallel manner to the upper surface of the first substrate 100 and may be disposed on a portion of the active area 105. Accordingly, the first transistor TR1 including a portion of the active area 105 and the first gate structure G1 may be formed.

The second transistor TR2 may include a second gate structure G2. The second gate structure G2 may intersect the active area 105. For example, the second gate structure G2 may extend in the second direction X and may be disposed on another portion of the active area 105. For example, the first gate structure G1 and the second gate structure G2 may be arranged in the first direction Y. Accordingly, the second transistor TR2 including another portion of the active area 105 and the second gate structure G2 may be formed.

Each of the first gate structure G1 and the second gate structure G2 may include a gate dielectric film 132 and a gate electrode 134 sequentially stacked on the first substrate 100.

The gate dielectric film 132 may be interposed between the active area 105 and the gate electrode 134. For example, the gate dielectric film 132 may conformally extend along and on an upper surface of the active area 105 and an upper surface of the element isolation pattern 110. The gate dielectric film 132 may include an insulating material, for example, made of at least one of silicon oxide, silicon oxynitride, silicon nitride, and a high dielectric constant (high-k) material having a dielectric constant higher than that of silicon oxide. However, the present inventive concept is not limited thereto. The high dielectric constant material may include, for example, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, lead zinc niobate, and combinations thereof. However, the present inventive concept is not limited thereto.

The gate electrode 134 may extend in the second direction X and may be disposed on the gate dielectric film 132. The gate electrode 134 may be made of a conductive material, for example, including at least one of polycrystalline silicon (poly Si), amorphous silicon (a-Si), titanium (Ti), titanium nitride (TiN), tungsten nitride (WN), titanium aluminum (TiAl), titanium aluminum nitride (TiAlN), tantalum nitride (TaN), titanium carbide (TiC), tantalum carbide (TaC), tantalum carbonitride (TaCN), tantalum silicon nitride (TaSiN), tantalum (Ta), cobalt (Co), ruthenium (Ru), aluminum (Al), tungsten (W), and combinations thereof. However, the present inventive concept is not limited thereto. Although the gate electrode 134 is illustrated as a single layer, this is only an example. The gate electrode 134 may be composed of multi-layers respectively made of the above conductive materials.

In an example embodiment of the present inventive concept, each of the first gate structure G1 and the second gate structure G2 may further include a gate spacer covering a side face of the gate electrode 134. The gate spacer may include an insulating material, for example, including at least one of silicon oxide, silicon nitride, silicon oxynitride, and combinations thereof. However, the present inventive concept is not limited thereto.

In an exemplary embodiment of the present inventive concept, each of the first gate structure G1 and the second gate structure G2 may further include a gate capping film covering an upper surface of the gate electrode 134. The gate capping film may include an insulating material, for example, including at least one of silicon oxide, silicon nitride, silicon oxynitride, and combinations thereof. However, the present inventive concept is not limited thereto.

Each of the transistors TR1 and TR2 may include a source/drain area 120. The source/drain area 120 may be disposed in the active area 105 (or on the active area 105). Further, the source/drain area 120 may be disposed on at least one side of each of the gate structures G1 and G2. For example, as shown in FIG. 8, the source/drain area 120 may be disposed in the active area 105 and at or adjacent to opposing sides of the first gate structure G1.

The source/drain area 120 may have a second conductivity type different from the first conductivity type. In one example, when each of the transistors TR1 and TR2 is an n-type transistor, the source/drain area 120 may include n-type impurity. The n-type impurity may include, for example, phosphorus (P) or arsenic (As). However, the present inventive concept is not limited thereto. The source/drain area 120 may be an impurity area formed by doping impurity into the active area 105, or may be an epitaxial layer grown on the active area 105.

In an exemplary embodiment of the present inventive concept, the source/drain area 120 may include a low concentration impurity area 122 and a high concentration impurity area 124. The high concentration impurity area 124 may be disposed in the low concentration impurity area 122. For example, the low concentration impurity area 122 may at least partially surround the high concentration impurity area 124. Each of the low concentration impurity area 122 and the high concentration impurity area 124 may be doped with impurities of the second conductivity type. In this regard, a doping concentration of the high concentration impurity area 124 may be higher than that of the low concentration impurity area 122.

The lower contacts 142 and 144 may be formed on the first substrate 100. The lower contacts 142 and 144 may be connected to each of the transistors TR1 and TR2. For example, the lower contacts 142 and 144 may be respectively connected to the source/drain area 120 and each of the gate structures G1 and G2. In one example, the lower contacts 142 and 144 may include the first lower contact 142, which is connected to the source/drain area 120 of the first transistor TR1, and the second lower contact 144, which is connected to the first gate structure G1 of the first transistor TR1.

In FIG. 4 and FIG. 5, each of the lower contacts 142 and 144 is shown to have a rectangular shape in a plan view. However, this is only an example. In another example, a shape of each of the lower contacts 142 and 144 may be various, such as different polygonal shapes, or an oval in a plan view.

The lower contacts 142 and 144 may extend in a vertical direction (hereinafter, a third direction Z) perpendicular to the upper surface of the first substrate 100 and may be connected to each of the transistors TR1 and TR2. For example, a first interlayer insulating film 192 covering the transistors TR1 and TR2 may be formed on the first substrate 100 and the element isolation pattern 110. The first lower contact 142 may be disposed to overlap a portion of the active area 105 in the third direction Z, and may extend through the first interlayer insulating film 192 and may contact the source/drain area 120 in the active area 105. In an exemplary embodiment of the present inventive concept, the first lower contact 142 may be in contact with the high concentration impurity area 124 of the source/drain area 120. The second lower contact 144 may be disposed to overlap a portion of the first gate structure G1 in the third direction Z, and may extend through the first interlayer insulating film 192 and may be in contact with the gate electrode 134 of the first gate structure G1.

To ensure reliability of connection of the first lower contact 142 to the source/drain area 120 within the active area 105, the first lower contact 142 may be spaced apart by a predefined distance from an outer edge of the active area 105 in a plan view. For example, as shown in FIG. 5, the first lower contact 142 may be spaced apart by a first distance $D1y$ from the outer edge of the active area 105 in the first direction Y. Further, the first lower contact 142 may be spaced apart by a second distance $D1x$ from the outer edge of the active area 105 in the second direction X. Each of the first distance $D1y$ and the second distance $D1x$ may be, for example, about 20 nm or larger. For example, the first distance $D1y$ and the second distance $D1x$ may be the same as each other or different from one another. However, the present inventive concept is not limited thereto. For example, each of the first distance $D1y$ and the second distance $D1x$ may be about 25 nm or greater.

To ensure reliability of a connection of the second lower contact 144 to the gate electrode 134 of the first gate structure G1, the second lower contact 144 may be spaced apart by a predefined distance from an outer edge of the first gate structure G1 in a plan view. For example, as shown in FIG. 5, the second lower contact 144 may be spaced apart by a third distance D2 from the outer edge of the first gate structure G1 in the first direction Y. The third distance D2 may be, for example, about 30 nm or greater. However, the present inventive concept is not limited thereto. For example, the third distance D2 may be about 40 nm or greater.

Each of the lower contacts 142 and 144 may have a tapered cross-section. For example, as shown in FIG. 6 to FIG. 8, a width of each of the lower contacts 142 and 144 may decrease as each of the lower contacts 142 and 144 approaches the upper surface of the first substrate 100. This may be due to characteristics of an etching process performed on the first interlayer insulating film 192 to form the lower contacts 142 and 144.

Each of the lower contacts 142 and 144 may include a conductive material, for example, a metal such as aluminum (Al), copper (Cu), or tungsten (W). However, the present inventive concept is not limited thereto.

The upper contacts 152 and 154 may be formed on the lower contacts 142 and 144, respectively. Each of the upper contacts 152 and 154 may be connected to one of the lower contacts 142 and 144. In one example, the upper contacts 152 and 154 may include the first upper contact 152, which is connected to the first lower contact 142, and the second upper contact 154, which is connected to the second lower contact 144.

In FIGS. 4 and 5, each of the upper contacts 152 and 154 is shown to have a rectangular shaped in a plan view. However, this is only an example. In another example, a shape of each of the upper contacts 152 and 154 may be various, such as a different polygonal shape, an oval, or a circle in a plan view.

Each of the upper contacts 152 and 154 may extend in the third direction Z and may be connected to one of the lower contacts 142 and 144. For example, a second interlayer insulating film 194 covering the first interlayer insulating film 192 and the lower contacts 142 and 144 may be formed. The first upper contact 152 may be disposed to overlap a portion of the first lower contact 142 in the third direction Z, and may extend through the second interlayer insulating film 194. For example, the first upper contact 152 may be in contact with an upper surface of the first lower contact 142. The second upper contact 154 may be disposed to overlap a portion of the second lower contact 144 in the third direction Z, and may extend through the second interlayer insulating film 194. For example, the second upper contact 154 may be in contact with an upper surface of the second lower contact 144.

Each of the upper contacts 152 and 154 may have a tapered cross-section. For example, as shown in FIGS. 6 to 8, a width of each of the upper contacts 152 and 154 may decrease as each of the upper contacts 152 and 154 approaches the upper surface of the first substrate 100. This may be due to characteristics of an etching process performed on the second interlayer insulating film 194 to form the upper contacts 152 and 154.

Each of the upper contacts 152 and 154 may include a conductive material, for example, a metal such as aluminum (Al), copper (Cu), or tungsten (W). However, the present inventive concept is not limited thereto. The upper contacts 152 and 154 may include the same conductive material as that of the lower contacts 142 and 144, or may include a conductive material different from that of the lower contacts 142 and 144.

The conductive lines 161 to 164 may extend in the first direction Y and may be arranged side by side in the second direction X. Further, the conductive lines 161 to 164 may be spaced from each other by substantially equal spacing in the second direction X. At least some of the conductive lines 161 to 164 may be insulated from each other via a third interlayer insulating film 196 disposed therebetween.

The conductive lines 161 to 164 may be formed on the upper contacts 152 and 154. Each of the conductive lines 161 to 164 may be connected to at least one of the upper contacts 152 and 154. In one example, one (e.g., 163) of the conductive lines 161 to 164 may contact an upper surface of the first upper contact 152, and another (e.g., 161) of the conductive lines 161 to 164 may be in contact with an upper surface of the second upper contact 154. Accordingly, the conductive lines 161 to 164 may be electrically connected to at least one of the transistors TR1 and TR2.

The conductive lines 161 to 164 may be connected to the bit-lines (e.g., BL1 to BLn in FIG. 2). In one example, four conductive lines 161 to 164 arranged in one area S may be electrically connected to eight bit-lines BL1 to BLn arranged in the memory cell block (e.g., 25 in FIG. 2). In an exemplary embodiment of the present inventive concept, each of the conductive lines 161 to 164 may be electrically connected to two bit-lines of the bit-lines BL1 to BLn.

In an exemplary, a pitch P between adjacent ones of the conductive lines 161 to 164 may be greater than a pitch between adjacent ones of the bit-lines (e.g., BL1 to BLn in FIG. 2) arranged in the memory cell block (e.g., 25 in FIG. 2); however, the present inventive concept is not limited thereto. In one example, when each of the conductive lines 161 to 164 is connected to two bit-lines of the bit-lines BL1 to BLn, the pitch P between adjacent ones of the conductive lines 161 to 164 may be about twice the pitch between adjacent ones of the bit-lines.

In an exemplary embodiment of the present inventive concept, each of the conductive lines 161 to 164 may be embodied as a line pattern connected to fine bit-lines (e.g., BL1 to BLn in FIG. 2). For example, a width W5 of each of the conductive lines 161 to 164 may be about 50 nm or smaller, and the pitch P between adjacent ones of the conductive lines 161 to 164 may be about 100 nm or smaller. In one example, the width W5 of each of the conductive lines 161 to 164 may be in a range of about 20 nm to about 40 nm, and the pitch P between adjacent ones of the conductive lines 161 to 164 may be in a range of about 30 nm to about 80 nm.

Each of the conductive lines 161 to 164 may have a tapered cross section. For example, as shown in FIGS. 6 to 8, the width of each of the conductive lines 161 to 164 may decrease as each of the conductive lines 161 to 164 extends toward the upper surface of the first substrate 100. This may be due to characteristics of an etching process performed on the third interlayer insulating film 196 to form the conductive lines 161 to 164.

Each of the conductive lines 161 to 164 may include a conductive material, for example, a metal such as aluminum (Al), copper (Cu), and/or tungsten (W). However, the present inventive concept is not limited thereto. The conductive lines 161 to 164 may include the same conductive material as that of the upper contacts 152 and 154, or may include a conductive material different from that of the upper contacts 152 and 154.

The transistors TR1 and TR2 may be interconnected to each other via the lower contacts 142 and 144, the upper contacts 152 and 154 and the conductive lines 161 to 164, such that the latch circuit, the connection circuit and/or the pre-charge circuit of the page buffer (e.g., PB in FIG. 3) may be realized. For example, the conductive lines 161 to 164 may act as various lines such as a cache latch line for connecting the page buffer PB to an external cache latch, a power line for supplying power voltage, a latch signal line that transfers data between the latch circuits of the page buffer PB, a sensing node line connected to the sensing node of the page buffer PB, and a wired OR line connected to a monitoring circuit to identify the data stored in the page buffer PB.

In an exemplary embodiment of the present inventive concept, signals complementary to each other may be transmitted via the latch signal lines. The page buffer PB may store data in or read data from the memory cells by pre-charging and then developing the sensing node.

In a following description, an example in which each of the conductive lines 161 to 164 acts as one of the lines as described above is described. However, this is only an example. A type, a number, an arrangement and an order of the conductive lines 161 to 164 may be variously modified.

In one example, the conductive lines 161 to 164 may include the first conductive line 161 for supplying power voltage to the transistors TR1 and TR2. The first conductive line 161 may be divided into a plurality of areas or portions in the first direction Y to supply power voltages of different magnitudes, respectively. For example, as shown in FIG. 4, one divided portion of the first conductive line 161 may be connected to the first gate structure G1 of the first transistor (TR1) to supply first power voltage thereto. The other divided portion of the first conductive line 161 may be connected to the active area 105 of the second transistor TR2 to supply second power voltage different from the first power voltage thereto.

In one example, the conductive lines 161 to 164 may include the second conductive line 162 and the third conductive line 163 interconnecting or isolating the transistors TR1 and TR2 to or from each other. To interconnect or isolate the transistors TR1 and TR2 to or from each other, each of the second conductive line 162 and the third conductive line 163 may be divided into a plurality of areas or portions in the first direction Y. For example, as shown in FIG. 4, one divided portion of the second conductive line 162 may be connected to the active area 105 of the first transistor TR1, one divided portion of the third conductive line 163 may be connected to the second gate structure G2 of the second transistor TR2, and the other divided portion of the third conductive line 163 may be connected to the active area 105 of the first transistor TR1. A single divided portion of the second conductive line 162 and a single divided portion of the third conductive line 163 may be interconnected to each other. For example, the other divided portion of the second conductive line 162 may be electrically connected to the other divided portion of the third conductive line 163.

In one example, the conductive lines 161 to 164 may include the fourth conductive line 164 providing the sensing node to the page buffer PB. The fourth conductive line 164 may extend continuously in the first direction Y and may be connected to the sensing node of the page buffer PB.

In an exemplary embodiment of the present inventive concept, the second conductive line 162 and the third conductive line 163 may be interposed between the first conductive line 161 and the fourth conductive line 164.

In an exemplary embodiment of the present inventive concept, each of the upper contacts 152 and 154 may have a larger size (or width) in the second direction X than that of each of the conductive lines 161 to 164 in the second direction X. For example, the second-directional width (W2x in FIG. 6) of the first upper contact 152 may be greater than a width W5 of each of the conductive lines 161 to 164. In addition, for example, the second-directional width (W4x in FIG. 7) of the second upper contact 154 may be greater than the width W5 of each of the conductive lines 161 to 164. As shown in FIG. 5, at least one of the upper contacts 152 and 154 may protrude in the second direction X from corresponding at least one of the conductive lines 161 to 164 in a plan view. Each of the second-directional widths W2x and W4x of the upper contacts 152 and 154 may be in a range of about 30 nm to about 80 nm. However, the present inventive concept is not limited thereto. For example, each of the second-directional widths W2x and W4x of the upper contacts 152 and 154 may be in a range of about 40 nm to about 60 nm.

Each of the lower contacts 142 and 144 may have a larger size (or width) in the second direction X than that of each of the upper contacts 152 and 154 in the second direction X corresponding thereto. For example, the second-directional width (W1x in FIG. 6) of the first lower contact 142 may be greater than the second-directional width (W2x in FIG. 6) of the first upper contact 152. In addition, for example, the second-directional width (W3x in FIG. 7) of the second lower contact 144 may be greater than the second-directional width (W4x in FIG. 7) of the second upper contact 154.

As shown in FIG. 5, at least one of the lower contacts 142 and 144 may respectively protrude from or beyond corresponding at least one of the upper contacts 152 and 154 in the second direction X in a plan view. For example, the first lower contact 142 may protrude beyond the first upper contact 152 in the second direction X, and the second lower contact 144 may protrude beyond the second upper contact 154 in the second direction X. Each of the second-directional widths W1x and W3x of the lower contacts 142 and 144 may be in a range of about 50 nm to about 160 nm. However, the present inventive concept is not limited thereto. In one example, the second-directional width (W1x of FIG. 6) of the first lower contact 142 may be in a range of about 80 nm to about 100 nm, and the second-directional width (W3x of FIG. 7) of the second lower contact 144 may be in a range of about 110 nm to about 130 nm.

Each of the lower contacts 142 and 144 may have a smaller size (or width) in the first direction Y than that of each of the upper contacts 152 and 154 in the first direction Y corresponding thereto. For example, the first-directional width (W1y in FIG. 8) of the first lower contact 142 may be smaller than the first-directional width (W2y in FIG. 8) of the first upper contact 152. However, the present inventive concept is not limited thereto. For example, the first-directional width W1y of the first lower contact 142 may be equal to the first-directional width W2y of the first upper contact 152.

As shown in FIG. 5, at least one of the upper contacts 152 and 154 may respectively protrude from corresponding at least one of the lower contacts 142 and 144 in the first direction Y in a plan view. The first-directional width W1y of each of the lower contacts 142 and 144 may be about 50 nm or smaller. However, the present inventive concept is not limited thereto. In one example, the first-directional width W1y of the lower contacts 142 and 144 may be in a range of about 10 nm to about 30 nm.

Alternatively, in an exemplary embodiment of the present inventive concept, least one of the lower contacts 142 and 144 may respectively protrude from corresponding at least one of the upper contacts 152 and 155 in the first direction Y in a plan view.

In an exemplary embodiment of the present inventive concept, each of the lower contacts 142 and 144 may have a larger size (or width) in the second direction X than that in the first direction Y. For example, the first-directional width (W1y in FIG. 8) of the first lower contact 142 may be greater than the second-directional width (W1x in FIG. 6) of the first lower contact 142. In an exemplary embodiment of the present inventive concept, each of the lower contacts 142 and 144 may include a long side extending in the second direction X and a short side extending in the first direction Y.

The drawing illustrates that the size of the first lower contact 142 in the first direction Y is substantially the same as the size of the second lower contact 144 in the first direction Y. However, this is only an example. In another example, the size of the first lower contact 142 in the first direction Y and the size of the second lower contact 144 in the first direction Y may be different from each other.

Further, the drawing illustrates that the size of the second lower contact 144 in the second direction X is larger than the size of the first lower contact 142 in the second direction X. However, this is only an example. In another example, the size of the first lower contact 142 in the second direction X and the size of the second lower contact 144 in the second direction X may be the same as each other.

In an exemplary embodiment of the present inventive concept, each of the lower contacts 142 and 144 may intersect with each of the upper contacts 152 and 154 connected thereto. For example, as shown in FIG. 5, each of the lower contacts 142 and 144 may extend in an elongate manner in the second direction X, and each of the upper contacts 152 and 154 may extend in an elongate manner in the first direction Y.

In an exemplary embodiment of the present inventive concept, at least one of the lower contacts 142 and 144 may overlap a plurality of conductive lines 161 to 164. In one example, a portion of the first lower contact 142 may overlap the third conductive line 163 connected thereto, while another portion of the first lower contact 142 may overlap the second conductive line 162 adjacent to the third conductive line 163. In addition, in one example, a portion of the second lower contact 144 may overlap the first conductive line 161 connected thereto, while another portion of the second lower contact 144 may overlap the second conductive line 162 adjacent to the first conductive line 161.

In an exemplary embodiment of the present inventive concept, each of the upper contacts 152 and 154 may overlap one conductive line of the conductive lines 161 to 164. In one example, the first upper contact 152 may overlap the third conductive line 163 connected thereto, and might not overlap the second conductive line 162 adjacent to the third conductive line 163. In addition, in one example, the second upper contact 154 may overlap the first conductive line 161 connected thereto, and might not overlap the second conductive line 162 adjacent to the first conductive line 161.

In an exemplary embodiment of the present inventive concept, the active area 105 may include a base area 105a and a protruding area 105b. The base area 105a may extend in an elongate manner in the first direction Y. The protruding area 105b may be disposed on at least one side surface of each of the gate structures G1 and G2. Further, the protruding area 105b may protrude from the base area 105a in the second direction X. In this regard, the first lower contact 142 may extend across the base area 105a and the protruding area 105b in the second direction X. For example, the first lower contact 142 may overlap the base area 105a and the protruding area 105b. In this case, a contact area between the first lower contact 142 and the active area 105 may be increased, so that electrical resistance between the first lower contact 142 and the active area 105 may be reduced.

In an exemplary embodiment of the present inventive concept, a vertical dimension (e.g., a height) of each of the lower contacts 142 and 144 may be greater than each of a vertical dimension of each of the upper contacts 152 and 154 and a vertical dimension of each of the conductive lines 161 to 164. For example, as shown in FIG. 8, the vertical dimension H1 of the first lower contact 142 may be greater than each of the vertical dimension H2 of the first upper contact 152 and the vertical dimension H3 of the third conductive line 163. The vertical dimension H1 of the first lower contact 142 may be, for example, about 100 nm or greater. In one example, the vertical dimension H1 of the first lower contact 142 may be in a range of about 200 nm to about 2,000 nm. Each of the vertical dimension H2 of the first upper contact 152 and the vertical dimension H3 of the third conductive line 163 may be in a range of about 10 nm to about 200 nm. For example, each of the vertical dimension H2 of the first upper contact 152 and the vertical dimension H3 of the third conductive line 163 may be in a range of about 50 nm to about 150 nm.

In an exemplary embodiment of the present inventive concept, a vertical level of the lowermost face of each of the conductive lines 161 to 164 may be lower than that of an upper surface of each of the upper contacts 152 and 154. For example, this may be due to the fact that a portion of the second interlayer insulating film 194 is etched in an etching process performed to form the conductive lines 161 to 164. However, the present inventive concept is not limited thereto. For example, the vertical level of the lowermost surface of each of the conductive lines 161 to 164 may be at a same level as that of an upper surface of each of the upper contacts 152 and 154.

Hereinafter, effects of the semiconductor device according to an exemplary embodiment of the present inventive concept as compared to a semiconductor device shown in FIGS. 9 and 10 will be described.

Figure 9:
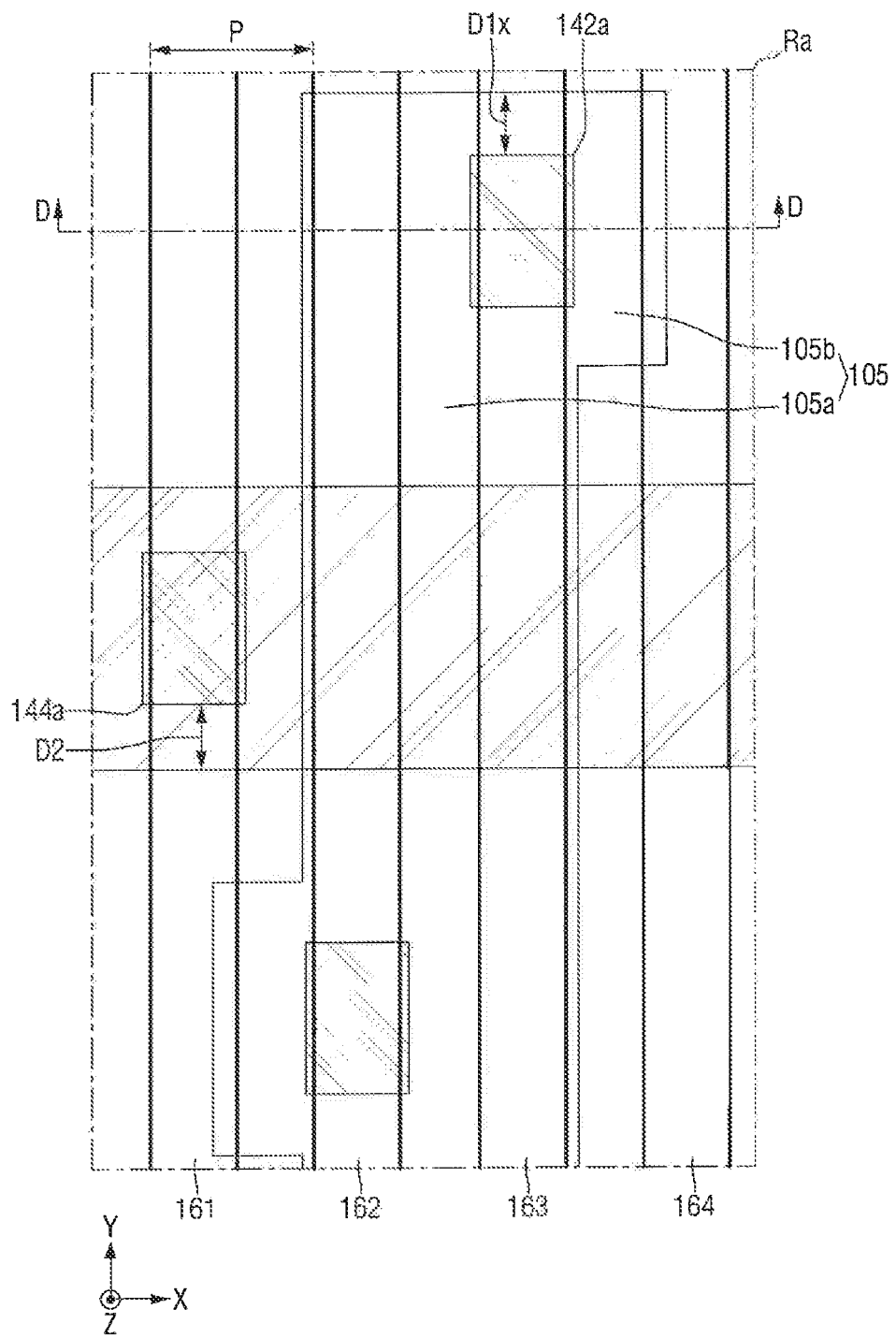
FIG. 9 is a layout diagram for illustrating an effect of a semiconductor device according to an exemplary embodiment of the present inventive concept.

FIG. 9 is a layout diagram for illustrating an effect of a semiconductor device according to an exemplary embodiment of the present inventive concept. FIG. 10 is a schematic cross-sectional view taken along D-D of FIG. 9. For convenience of illustration, elements and/or components already described above with reference to FIGS. 1 to 8 may be briefly described or omitted. For reference, FIG. 9 is an enlarged view to illustrate an Ra area compared to the R1 area in FIG. 5.

Figure 10:
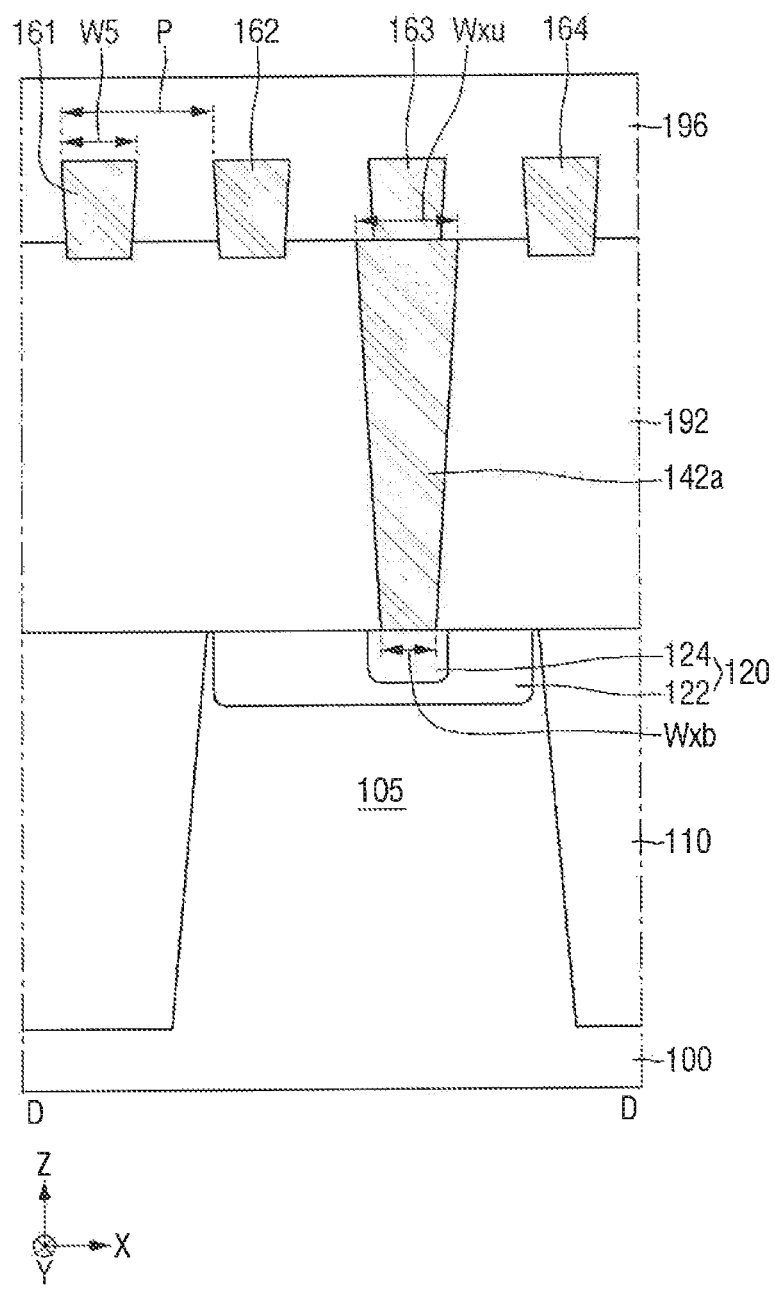
FIG. 10 is a schematic cross-sectional view taken along D-D of FIG. 9.

Referring to FIG. 9 and FIG. 10, in the semiconductor device according to FIG. 9 and FIG. 10, lower contacts (142a, 144a) are directly connected to the conductive lines 161 to 164.

For example, the semiconductor device according to FIG. 9 and FIG. 10 might not include the upper contacts (152 and 154 in FIGS. 4 to 8). For example, one (e.g., 163) of the conductive lines 161 to 164 may be in contact with an upper surface of the first lower contact 142a, while another (e.g., 161) of the conductive lines 161 to 164 may contact an upper surface of the second lower contact 144a.

In this case, reliability of connection between the lower contacts 142a and 144a and the transistors TR1 and TR2 may be reduced. For example, as the bit-lines (e.g., BL1 to BLn in FIG. 2) of the non-volatile memory device are becoming smaller, the pitch P between adjacent ones of the conductive lines 161 to 164 connected thereto is also becoming smaller. Accordingly, each of the lower contacts 142a and 144a connected to bottoms of each of the conductive lines 161 to 164 is limited in a size thereof in a direction (e.g., the second direction X) in which the conductive lines 161 to 164 are arranged. For example, to prevent a short circuit with a conductive line (e.g., the second conductive line 162 or the fourth conductive line 164) adjacent to the third conductive line 163, the second-directional width Wxu of an upper surface of the first lower contact 142a may be limited to a size equal to or smaller than a predefined size. Further, as described above, each of the lower contacts 142a and 144a may have a tapered cross-section. Accordingly, for example, the second-directional width Wxb of a bottom of the first lower contact 142a may be further limited, and thus the connection reliability between the first lower contact 142a and the source/drain area 120 may be lowered However, in the semiconductor device according to an exemplary embodiment of the present inventive concept, the lower contacts 142 and 144 may be connected to the conductive lines 161 to 164 via the upper contacts 152 and 154, respectively. As described above with reference to FIGS. 4 to 8, when the upper contacts 152 and 154 are interposed between the lower contacts 142 and 144 and the conductive lines 161 to 164, each of the lower contacts 142 and 144 might not have size limitation in the direction (for example, the second direction X) in which the conductive lines 161 to 164 are arranged. Accordingly, each of the lower contacts 142 and 144 may have an increased size in the second direction X, and thus the reliability of the connection between the lower contacts 142 and 144 and the transistors TR1 and TR2 may be increased.

In addition, as shown in FIG. 9, to compensate for the deterioration of electrical resistance as the size in the second direction X of each of the lower contacts 142a and 144a is limited, the lower contacts 142a and 144a having an increased size in the first direction Y may be considered. However, the lower contacts 142a and 144a having the increased size in the first direction Y may increase a size of the semiconductor device in the first direction Y. For example, the lower contacts 142a and 144a having the increased size in the first direction Y may increase a size of the page buffer (e.g., PB in FIG. 3) in the first direction Y. This leads to increase in a chip size.

However, as described above with reference to FIGS. 4 to 8, when the upper contacts 152 and 154 are interposed between the lower contacts 142 and 144 and the conductive lines 161 to 164, the lower contacts 142 and 144 might not have the size limitation in the direction (e.g., the second direction X) in which the conductive lines 161 to 164 are arranged. Therefore, each of the lower contacts 142 and 144 may have a reduced size in the first direction Y while not causing deterioration of the electrical resistance. Thus, the size in the first direction Y of the page buffer (e.g., PB in FIG. 3) may be reduced, thereby reducing an overall chip size.

Figure 11:
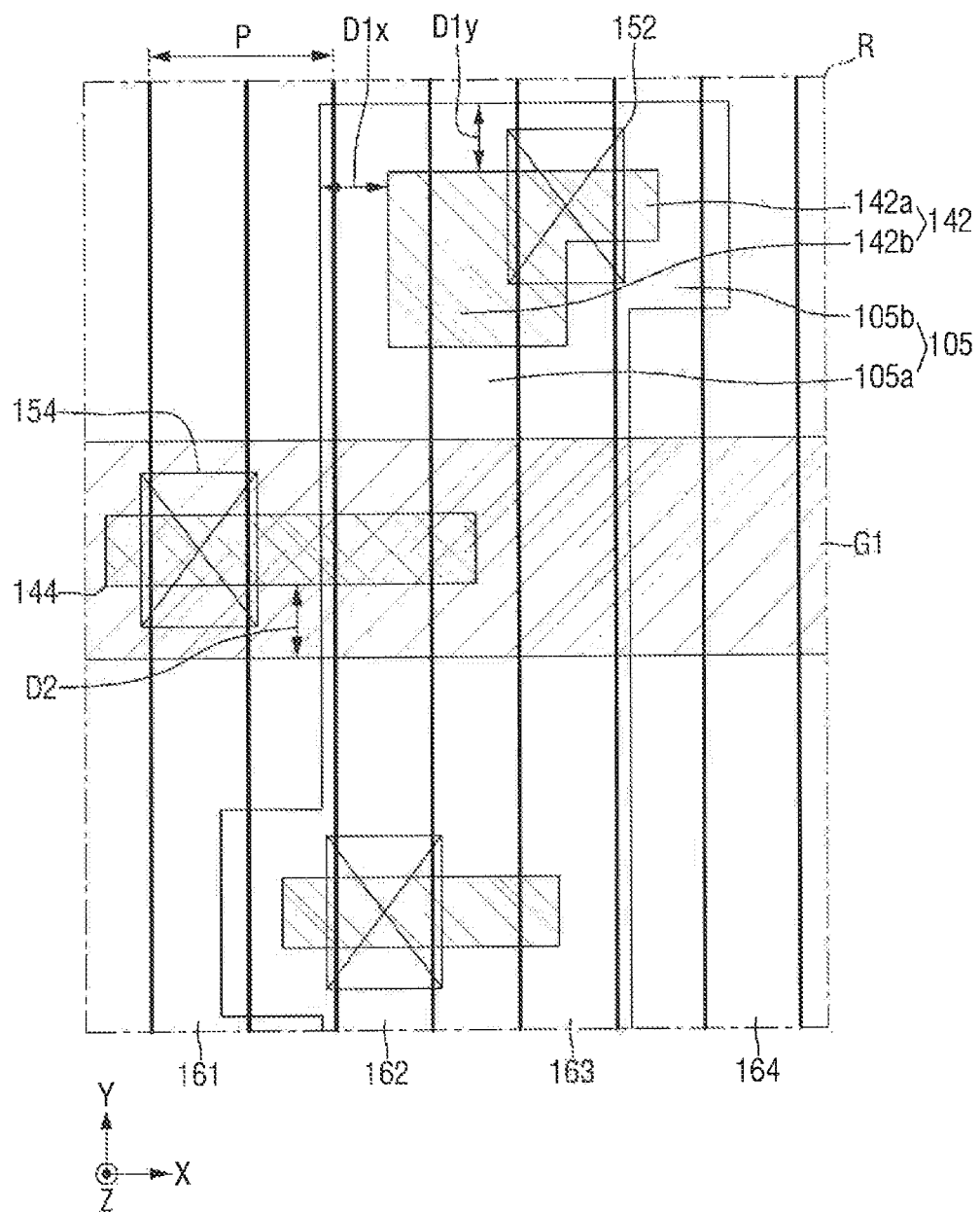
FIGS. 11, 12 and 13 are various enlarged views for illustrating a semiconductor device according to an exemplary embodiment of the present inventive concept.
Figure 12:
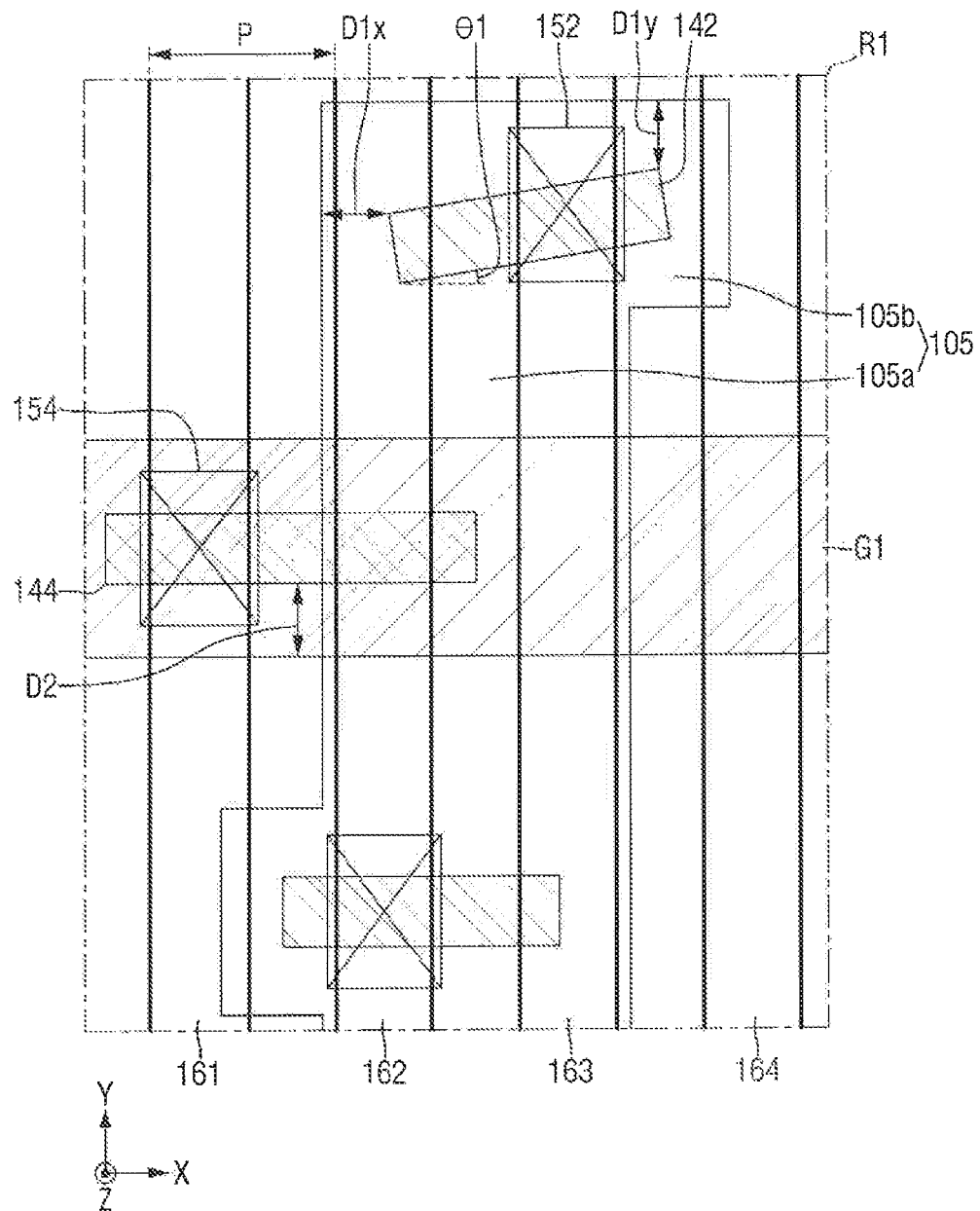
Figure 13:
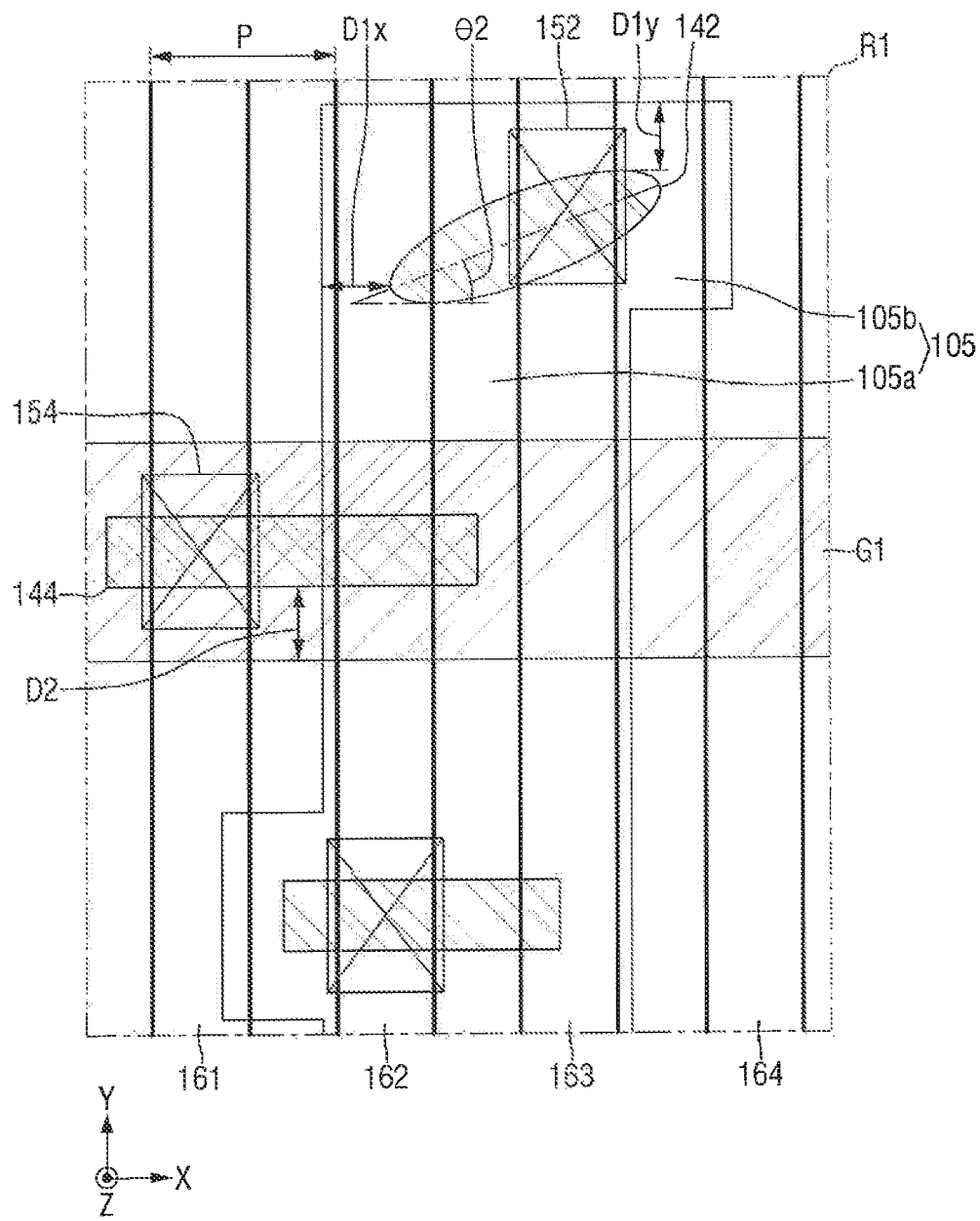

FIGS. 11 to 13 are various enlarged views for illustrating a semiconductor device according to an exemplary embodiment of the present inventive concept. For convenience of illustration, elements and/or components already described above with reference to FIGS. 1 to 10 may be briefly described or omitted.

Referring to FIG. 11, in the semiconductor device according to an exemplary embodiment of the present inventive concept, at least one of the lower contacts 142 and 144 includes a base 142a and a protrusion 142b.

For example, the first lower contact 142 may include the base 142a and the protrusion 142b. The base 142a may extend in an elongate manner in the second direction X. In one example, the base 142a may extend in the second direction X across the base area 105a and the protruding area 105b of the active area 105. The protrusion 142b may protrude from the base 142a in the first direction Y. In one example, the protrusion 142b may protrude from the base 142a toward the first gate structure G1 while being disposed in the protruding area 105b. Since the first lower contact 142 may have a further increased size, connection reliability between the first lower contact 142 and the active area 105 may be further increased.

The base 142a and the protrusion 142b may be spaced apart from an outer edge of the active area 105 by a predefined distance (e.g., a first distance D1y and a second distance D1x) in a plan view.

The second lower contact 144 is shown so as not to include the base 142a and the protrusion 142b. However, this is only an example. In another example, each of the first lower contact 142 and the second lower contact 144 may include the base 142a and protrusion 142b.

Referring to FIG. 12, in a semiconductor device according to an exemplary embodiment of the present inventive concept, at least one of the lower contacts 142 and 144 is inclined at a predefined angle from a plan view.

For example, a long side of the first lower contact 142 may extend in a first angle θ1 relative to the second direction X. For example, the first angle θ1 may be acute. The first lower contact 142 may increase a degree of freedom of the active area 105, thereby achieving efficient space utilization according to an arrangement.

The inclined first lower contact 142 may be spaced apart from an outer edge of the active area 105 in a plan view by a predefined distance (e.g., the first distance D1y and the second distance D1x).

The second lower contact 144 is shown so as not to be inclined. However, this is only an example. In another example, each of the first lower contact 142 and the second lower contact 144 may both extend in an inclined manner.

Referring to FIG. 13, in a semiconductor device according to an exemplary embodiment of the present inventive concept, at least one of the lower contacts 142 and 144 is formed in an elliptical shape in a plan view.

For example, the first lower contact 142 may be formed in the elliptical shape in a plan view. In an exemplary embodiment of the present inventive concept, the elliptical first lower contact 142 may have a major axis extending in a second angle θ2 relative to the second direction X. For example, the second angle θ1 may be acute. The first lower contact 142 may increase the degree of freedom of the active area 105, thereby achieving efficient space utilization according to an arrangement.

The elliptical first lower contact 142 may be spaced apart from an outer edge of the active area 105 in a plan view by a predefined distance (e.g., the first distance D1y and the second distance D1x).

The second lower contact 144 is shown so as to have a rectangular shape. However, this is only an example. In another example, each of the first lower contact 142 and the second lower contact 144 may have the elliptical shape.

Hereinafter, a non-volatile memory device according to an exemplary embodiment of the present inventive concept will be described with reference to FIGS. 14 to 18.

Figure 14:
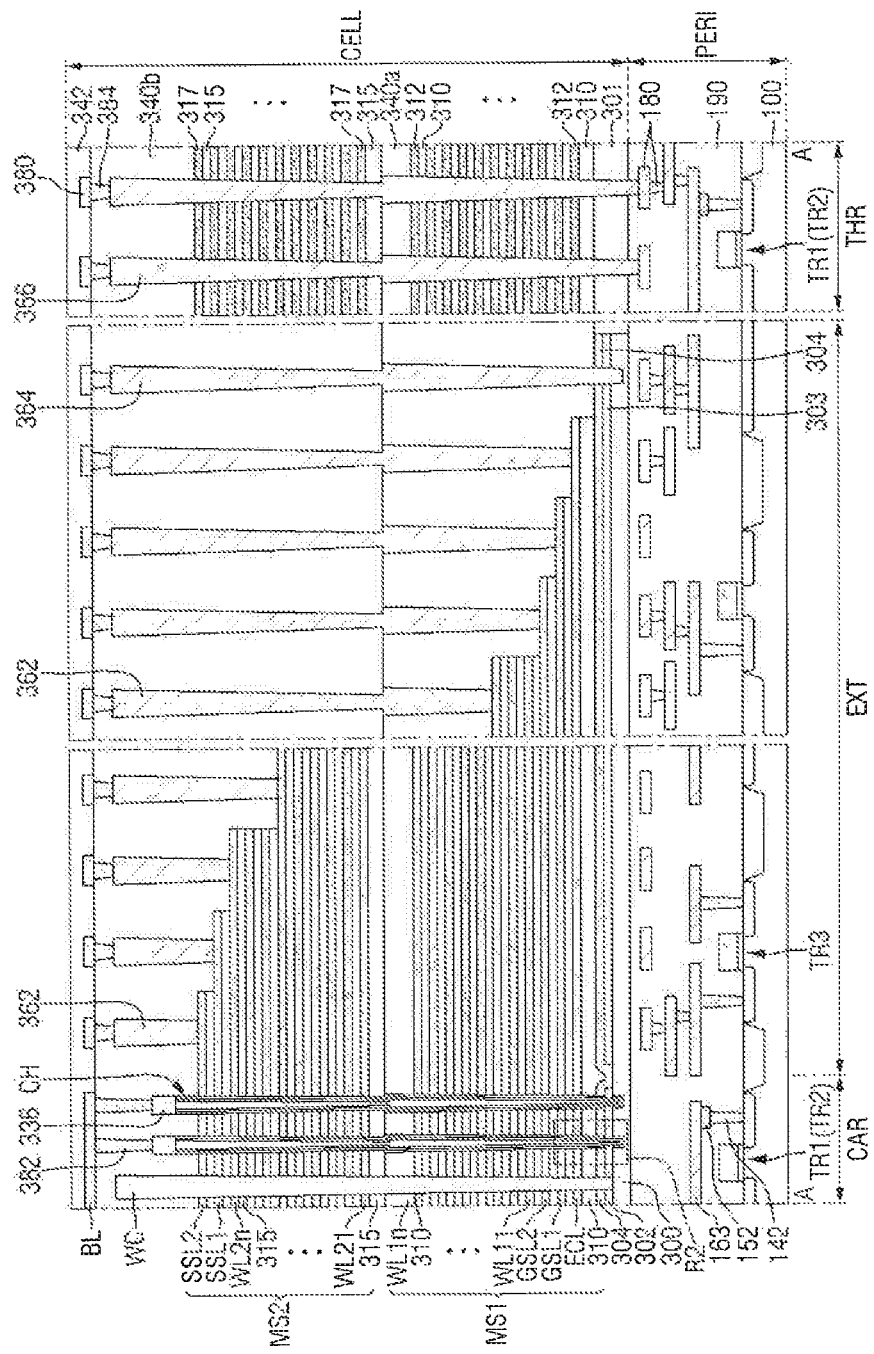
FIG. 14 is a cross-sectional view for illustrating a non-volatile memory device including a semiconductor device according to an exemplary embodiment of the present inventive concept.
Figure 15:
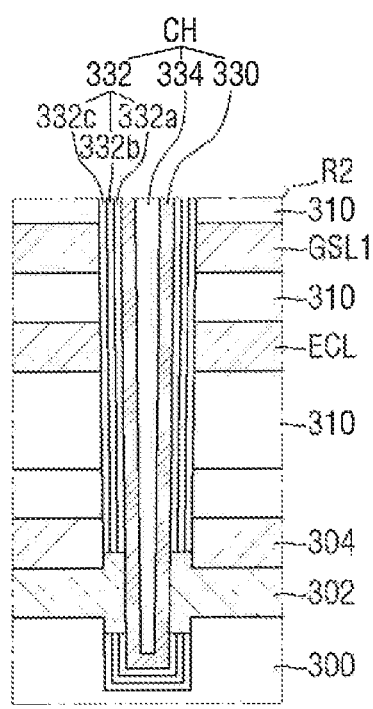
FIG. 15 is an enlarged view to illustrate a R2 area of FIG. 14.

FIG. 14 is a cross-sectional view for illustrating a non-volatile memory device including a semiconductor device according to an exemplary embodiment of the present inventive concept. FIG. 15 is an enlarged view to illustrate a R2 area of FIG. 14. For convenience of illustration, elements and/or components already described above with reference to FIGS. 1 to 13 may be briefly described or omitted.

Referring to FIG. 14 and FIG. 15, a non-volatile memory device including a semiconductor device according to an exemplary embodiment of the present inventive concept includes a memory cell area CELL and a peripheral circuit area PERI.

The memory cell area CELL may include a second substrate 300, an insulating substrate 301, a mold structure MS1 and MS2, an interlayer insulating film 340a and 340b, a channel structure CH, a word-line cutting area WC, a bit-line BL, a cell contact 362, a source contact 364, a through-via 366, and a first line structure 380.

The second substrate 300 may include, for example, a semiconductor substrate such as a silicon substrate, a germanium substrate, or a silicon-germanium substrate. In addition, the second substrate 300 may include a silicon-on-insulator (Silicon-On-Insulator: SOI) substrate or a (GOI) Germanium-On-Insulator substrate, and the like. In an exemplary embodiment of the present inventive concept, the second substrate 300 may include impurities. For example, the second substrate 300 may include n-type impurities (e.g., phosphorus (P), arsenic (As), etc.). As used herein, the second substrate 300 may also be referred to as a cell substrate.

The second substrate 300 may include a cell array area CAR and an extension area EXT.

The memory cell array (e.g., 20 in FIG. 1) including the plurality of memory cells may be formed in the cell array area CAR. For example, the channel structure CH, the bit-line BL, and gate electrodes ECL, GSL1, GSL2, WL11 to WL1n, WL21 to WL2n, SSL1, and SSL2, which will be described later may be disposed in the cell array area CAR. In a following description, a surface of the second substrate 300 on which the memory cell array is disposed may be referred to as a front surface of the second substrate 300. A surface of the second substrate 300 opposite to the front surface of the second substrate 300 may be referred to as a back surface of the second substrate 300.

The extension area EXT may be disposed around the cell array area CAR. In the extension area EXT, the gate electrodes ECL, GSL1, GSL2, WL11 to WL1n, WL21 to WL2n, SSL1, and SSL2 to be described later may be stacked in a stepped manner.

In an exemplary embodiment of the present inventive concept, the second substrate 300 may further include a through area THR. The through area THR may be disposed in the cell array area CAR and the extension area EXT or may be disposed outside the cell array area CAR and the extension area EXT. The through-via 366 to be described later may be disposed in the through area THR.

The insulating substrate 301 may be formed in the second substrate 300 and in the extension area EXT. The insulating substrate 301 may constitute an insulating area in the second substrate 300 and in the extension area EXT thereof. In an exemplary embodiment of the present inventive concept, the insulating substrate 301 may be formed in the second substrate 300 and in the through area THR thereof.

The mold structures MS1 and MS2 may be formed on the front surface of the second substrate 300. The mold structure MS1 and MS2 may include a plurality of gate electrodes ECL, GSL1, GSL2, WL11 to WL1n, WL21 to WL2n, SSL1, and SSL2 and a plurality of mold insulating films 310 and 315 stacked on the second substrate 300. Each of the gate electrodes ECL, GSL1, GSL2, WL11 to WL1n, WL21 to WL2n, SSL1, and SSL2 and each of the mold insulating films 310 and 315 may have a layered structure extending in a parallel manner to the front surface of the second substrate 300. The gate electrodes ECL, GSL1, GSL2, WL11 to WL1n, WL21 to WL2n, SSL1, and SSL2 may be sequentially stacked on the second substrate 300 while being spaced apart from each other by each of the mold insulating films 310 and 315.

In an exemplary embodiment of the present inventive concept, the mold structure MS1 and MS2 may include the first mold structure MS1 and the second mold structure MS2 that are sequentially stacked on the second substrate 300.

The first mold structure MS1 may include the first gate electrodes ECL, GSL1, GSL2, and WL11 to WL1n and the first mold insulating films 310 alternately stacked on the second substrate 300. In an exemplary embodiment of the present inventive concept, the first gate electrodes ECL, GSL1, GSL2, and WL11 to WL1n may include the erase control line ECL, the ground select line GSL1 and GSL2 and the plurality of first word-lines WL11 to WL1n sequentially stacked on the second substrate 300. In an exemplary embodiment of the present inventive concept, the erase control line ECL may be omitted.

The second mold structure MS2 may include the second gate electrodes WL21 to WL2n, SSL1 and SSL2 and the second mold insulating films 315 that are alternately stacked on the first mold structure MS1. In an exemplary embodiment of the present inventive concept, the second gate electrodes WL21 to WL2n, SSL1, and SSL2 may include the plurality of second word-lines WL21 to WL2n, and the string select lines SSL1 and SSL2 sequentially stacked on the first mold structure MS1.

Each of the gate electrodes ECL, GSL1, GSL2, WL11 to WL1n, WL21 to WL2n, SSL1, and SSL2 may be made of a conductive material, for example, a metal such as tungsten (W), cobalt (Co), and/or nickel (Ni) or a semiconductor material such as silicon. However, the present inventive concept is not limited thereto.

Each of the mold insulating films 310 and 315 may include an insulating material, for example, at least one of silicon oxide, silicon nitride, and/or silicon oxynitride. However, the present inventive concept is not limited thereto.

In an exemplary embodiment of the present inventive concept, the mold structure MS1 and MS2 in the through area (THR) may include a plurality of mold sacrificial films 312 and 317 and a plurality of mold insulating films 310 and 315 alternately stacked on the second substrate 300 and/or the insulating substrate 301. Each of the mold sacrificial films 312 and 317 and each of the mold insulating films 310 and 315 may have a layered structure extending in a parallel manner to the upper surface of the second substrate 300. The mold sacrificial films 312 and 117 may be sequentially stacked on the second substrate 300 while being spaced apart from each other by each of the mold insulating films 310 and 315.

In an exemplary embodiment of the present inventive concept, the first mold structure MS1 in the through area (THR) may include the first mold sacrificial films 312 and the first mold insulating films 310 alternately stacked on the second substrate 300. The second mold structure MS2 in the through area THR may include the second mold sacrificial films 317 and the second mold insulating films 315 that are alternately stacked on the first mold structure MS1.

Each of the mold sacrificial films 312 and 317 may include an insulating material, for example, at least one of silicon oxide, silicon nitride, and/or silicon oxynitride. However, the present inventive concept is not limited thereto. In an exemplary embodiment of the present inventive concept, each of the mold sacrificial films 312 and 317 may include a material having an etch selectivity with respect to each of the mold insulating films 310 and 315. In one example, each of the mold insulating films 310 and 315 may include silicon oxide, while each of the mold sacrificial films 312 and 317 may include silicon nitride.

The interlayer insulating films 340a and 340b may be formed on the second substrate 300 so as to respectively cover the mold structures MS1 and MS2. Each of the interlayer insulating films 340a and 340b may include, for example, at least one of silicon oxide, silicon oxynitride, and/or a low-k material having a dielectric constant lower than that of silicon oxide. However, the present inventive concept is not limited thereto.

The channel structure CH may be formed in the mold structure MS1 and MS2 and in the cell array area CAR. The channel structure CH may extend in a vertical direction (e.g., the third direction Z) intersecting the upper surface of the second substrate 300 and may extend through the mold structure MS1 and MS2. For example, the channel structure CH may have a pillar shape (e.g., a cylindrical shape) extending in the third direction Z. Accordingly, the channel structure CH may intersect each of the gate electrodes ECL, GSL1, GSL2, WL11 to WL1n, WL21 to WL2n, SSL1, and SSL2. In an exemplary embodiment of the present inventive concept, the channel structure CH may have a stepped portion between the first mold structure MS1 and the second mold structure MS2. For example, the channel structure CH may have a stepped portion adjacent to an interface between the first mold structure MS1 and the second mold structure MS2

As shown in FIG. 15, the channel structure CH may include a semiconductor pattern 330 and an information storage film 332.

The semiconductor pattern 330 may extend in the third direction Z so as to extend through the mold structure MS1 and MS2. Although the semiconductor pattern 330 is illustrated only in a shape of a square U-shape, this is only an example. In another example, the semiconductor pattern 330 may have various shapes, such as a cylindrical shape, a rectangular cylindrical shape, and a solid pillar shape. The semiconductor pattern 330 may include, for example, a semiconductor material such as single crystal silicon, polycrystalline silicon, an organic semiconductor material, and a carbon nano structure. However, the present inventive concept is not limited thereto.

The information storage film 332 may be interposed between the semiconductor pattern 330 and each of the gate electrodes ECL, GSL1, GSL2, WL11 to WL1n, WL21 to WL2n, SSL1, and SSL2. For example, the information storage film 332 may extend along and on an outer face of the semiconductor pattern 330. The information storage film 332 may include, for example, at least one of silicon oxide, silicon nitride, silicon oxynitride, and/or a high dielectric constant material having a dielectric constant greater than that of silicon oxide.

In an exemplary embodiment of the present inventive concept, the information storage film 332 may be composed of a multilayer. For example, as shown in FIG. 15, the information storage film 332 may include a tunnel insulating film 332a, a charge storage film 332b, and a blocking insulating film 332c that are sequentially stacked on the outer surface of the semiconductor pattern 330.

The tunnel insulating film 332a may include, for example, silicon oxide or a high dielectric constant material (e.g., aluminum oxide ($Al_2O_3$), hafnium oxide ($HfO_2$)) having a dielectric constant higher than that of silicon oxide. The charge storage film 332b may include, for example, silicon nitride. The blocking insulating film 332c may include, for example, silicon oxide or a high dielectric constant material (e.g., aluminum oxide ($Al_2O_3$), hafnium oxide ($HfO_2$)) having a dielectric constant higher than that of silicon oxide.

In an exemplary embodiment of the present inventive concept, the channel structure CH may further include a filling pattern 334. The filling pattern 334 may be formed to fill an inside of the square U-shaped semiconductor pattern 330. The filling pattern 334 may include an insulating material, for example, silicon oxide. However, the present inventive concept is not limited thereto.

In an exemplary embodiment of the present inventive concept, the channel structure CH may further include a channel pad 336. The channel pad 336 may be connected to an upper surface of the semiconductor pattern 330. The channel pad 336 may include, for example, polysilicon doped with an impurity. However, the present inventive concept is not limited thereto.

In an exemplary embodiment of the present inventive concept, a first source structure 302 and 304 may be formed on the second substrate 300. The first source structure 302 and 304 may be interposed between the second substrate 300 and the mold structure MS1 and MS2. For example, the first source structure 302 and 304 may extend along and on the upper surface of the second substrate 300. The first source structure 302 and 304 may be formed to be connected to the semiconductor pattern 330 of the channel structure CH.

For example, as shown in FIG. 15, the first source structure 302 and 304 may extend through the information storage film 332 so as to contact the semiconductor pattern 330. The first source structure 302 and 304 may act as the common source line (e.g., CSL of FIG. 2) of the non-volatile memory device. The first source structure 302 and 304 may include, for example, impurity-doped polysilicon or metal. However, the present inventive concept is not limited thereto.

In an exemplary embodiment of the present inventive concept, the channel structure CH may extend through the first source structure 302 and 304. For example, the channel structure CH may extend through the first source structure 302 and 304 such that a bottom of the structure CH is disposed in the second substrate 300.

In an exemplary embodiment of the present inventive concept, the first source structure 302 and 304 may be composed of a multilayer. For example, the first source structure 302 and 304 may include the first source layer 302 and the second source layer 304 sequentially stacked on the second substrate 300. Each of the first source layer 302 and the second source layer 304 may include impurity-doped polysilicon or impurity-non-doped polysilicon. However, the present inventive concept is not limited thereto. The first source layer 302 in contact with the semiconductor pattern 330 may act as the common source line (e.g., CSL of FIG. 2) of the non-volatile memory device. The second source layer 304 may act as a support layer to prevent collapse of a mold stack in a replacement process for forming the first source layer 302.

A base insulating film may be interposed between the second substrate 300 and the first source structure 302 and 304. The base insulating film may include, for example, at least one of silicon oxide, silicon nitride, and silicon oxynitride. However, the present inventive concept is not limited thereto.

In an exemplary embodiment of the present inventive concept, a source sacrificial film 303 may be formed on a portion of the second substrate 300. For example, the source sacrificial film 303 may be formed on the second substrate 300 and in the extension area EXT thereof. The source sacrificial film 303 may include a material having an etching selectivity with respect to the mold insulating films 310 and 315. In one example, each of the mold insulating films 310 and 315 may include silicon oxide, while the source sacrificial film 303 may include silicon nitride. The source sacrificial film 303 may be a layer remaining after a portion thereof is replaced with the first source layer 302 in a manufacturing process of the first source structure 302 and 304.

The word-line cutting area WC may extend in one direction (e.g., the second direction X intersecting the bit-line BL) and may cut the mold structure MS1 and MS2. The mold structure MS1 and MS2 may be divided into a plurality of memory cell blocks (e.g., BLK1 to BLKn in FIG. 1) via the word-line cutting area WC.

The bit-line BL may be formed on the mold structure MS1 and MS2. The bit-line BL may extend in a direction (e.g., the first direction Y) intersecting the word-line cutting area WC. Further, the bit-line BL may be connected to the plurality of channel structures CH. For example, a bit-line contact 382 connected to a top of each channel structure CH may be formed in the interlayer insulating film 340a and 340b. The bit-line BL may be electrically connected to the channel structures CH via the bit-line contacts 382.

The cell contact 362 may be connected to each of the gate electrodes ECL, GSL1, GSL2, WL11 to WL1n, WL21 to WL2n, SSL1, and SSL2. For example, the cell contact 362 may extend in the third direction Z and may be received in the interlayer insulating film 340a and 340b. In addition, the cell contact 362 may be connected to each of the gate electrodes ECL, GSL1, GSL2, WL11 to WL1n, WL21 to WL2n, SSL1, and SSL2. In an exemplary embodiment of the present inventive concept, the cell contact 362 may have a stepped portion between the first mold structure MS1 and the second mold structure MS2.

The source contact 364 may be connected to the first source structure 302 and 304. For example, the source contact 364 may extend in the third direction Z and may be received in the interlayer insulating film 340a and 340b. In addition, the source contact 364 may be connected to the second substrate 300. In an exemplary embodiment of the present inventive concept, the source contact 364 may have a stepped portion between the first mold structure MS1 and the second mold structure MS2.

The through via 366 may be disposed in the through area THR. For example, the through-via 366 may extend in the third direction Z and may be received in a portion of the mold structure MS1 and MS2 in the through area THR. In an exemplary embodiment of the present inventive concept, the through-via 366 may have a stepped portion between the first mold structure MS1 and the second mold structure MS2. Although the through-via 366 is only shown so as to extend through the mold structure MS1 and MS2, this is only an example. In another example, the through-via 366 may be disposed outside the mold structure MS1 and MS2 and might not extend through the mold structure MS1 and MS2.

Each of the cell contact 362, the source contact 364, and the through-via 366 may be connected to the first line structure 380 on the interlayer insulating film 340a and 340b. For example, a first interline insulating film 342 may be formed on the interlayer insulating film 340a and 340b. The first line structure 380 may be formed in the first interline insulating film 342. Each of the cell contact 362, the source contact 364, and the through-via 366 may be connected to the first line structure 380 via a contact via 384. The first line structure 380 may be connected to the bit-line BL.

The peripheral circuit area PERI may include the first substrate 100, peripheral circuit elements TR1, TR2, and TR3, and a second line structure 180.

The first substrate 100 may be disposed below the second substrate 300. For example, an upper surface of the first substrate 100 may face a bottom surface of the second substrate 300. As used herein, the first substrate 100 may also be referred to as a peripheral circuit substrate.

The peripheral circuit elements TR1, TR2, and TR3 may be formed on the first substrate 100. The peripheral circuit elements TR1, TR2, and TR3 may constitute a peripheral circuit (e.g., 30 in FIG. 1) that controls an operation of the non-volatile memory device. For example, the peripheral circuit elements TR1, TR2, and TR3 may include the control logic (e.g., 37 in FIG. 1), the row decoder (e.g., 33 in FIG. 1), and the page buffer (e.g., 35 in FIG. 1). In a following description, a surface of the first substrate 100 on which the peripheral circuit elements TR1, TR2, and TR3 are disposed may be referred to as a front surface of the first substrate 100. A surface of the first substrate 100 opposite to the front surface of the first substrate 100 may be referred to as a back face of the first substrate 100.

Each of the peripheral circuit elements TR1, TR2, and TR3 may include, for example, a transistor. However, the present inventive concept is not limited thereto. For example, the peripheral circuit elements TR1, TR2, and TR3 may include various active elements such as a transistor, as well as various passive elements such as a capacitor, a resistor, and an inductor.

In an exemplary embodiment of the present inventive concept, a back surface of the second substrate 300 may face the front surface of the first substrate 100. For example, a second interline insulating film 190 covering the peripheral circuit elements TR1, TR2, and TR3 may be formed on the front surface of the first substrate 100. The second substrate 300 and/or the insulating substrate 301 may be stacked on an upper surface of the second interline insulating film 190.

The first line structure 380 may be connected to the peripheral circuit elements TR1, TR2, and TR3 via the through-via 366. For example, the second line structure 180 connected to the peripheral circuit elements TR1, TR2, and TR3 may be formed in the second interline insulating film 190. The through-via 366 may extend in the third direction Z so as to connect the first line structure 380 and the second line structure 180 to each other. Accordingly, the bit-line BL, each of the gate electrodes ECL, GSL1, GSL2, WL11 to WL1n, WL21 to WL2n, SSL1, and SSL2 and/or the first source structure 302 and 304 may be electrically connected to the peripheral circuit elements TR1, TR2, and TR3.

In an exemplary embodiment of the present inventive concept, the through-via 366 may extend through the insulating substrate 301 so as to connect the first line structure 380 and the second line structure 180 to each other. Thus, the through-via 366 may be electrically isolated from the second substrate 300.

In an exemplary embodiment of the present inventive concept, the peripheral circuit elements TR1, TR2, and TR3 may include the semiconductor device as described above with reference to FIGS. 1 to 13. In one example, the peripheral circuit elements TR1, TR2, and TR3 may include the transistors TR1 and TR2 as described above with reference to FIGS. 4 to 8.

The transistors TR1 and TR2 may constitute the page buffer circuit (e.g., 35 in FIG. 2) in the peripheral circuit area PERI. For example, the transistors TR1 and TR2 may be interconnected to each other via the lower contacts 142 and 144, the upper contacts 152 and 154 and the conductive lines 161 to 164, and thus, may constitute the latch circuit, the connection circuit, and/or the pre-charge circuit of the page buffer (e.g., PB in FIG. 3). The conductive lines 161 to 164 may be electrically connected to the bit-line BL via the second line structure 180, the through-via 366, and the first line structure 380. In an exemplary embodiment of the present inventive concept, the transistors TR1 and TR2 may be disposed in a cell array area CAR and/or a through area THR.

Further, the peripheral circuit elements TR1, TR2, and TR3 may include the third transistor TR3. The third transistor TR3 may constitute peripheral circuits (e.g., the row decoder circuit (e.g., 33 in FIG. 1) or the control logic circuit (e.g., 37 in FIG. 1)) except for the page buffer circuit in the peripheral circuit area PERI.

Figure 16:
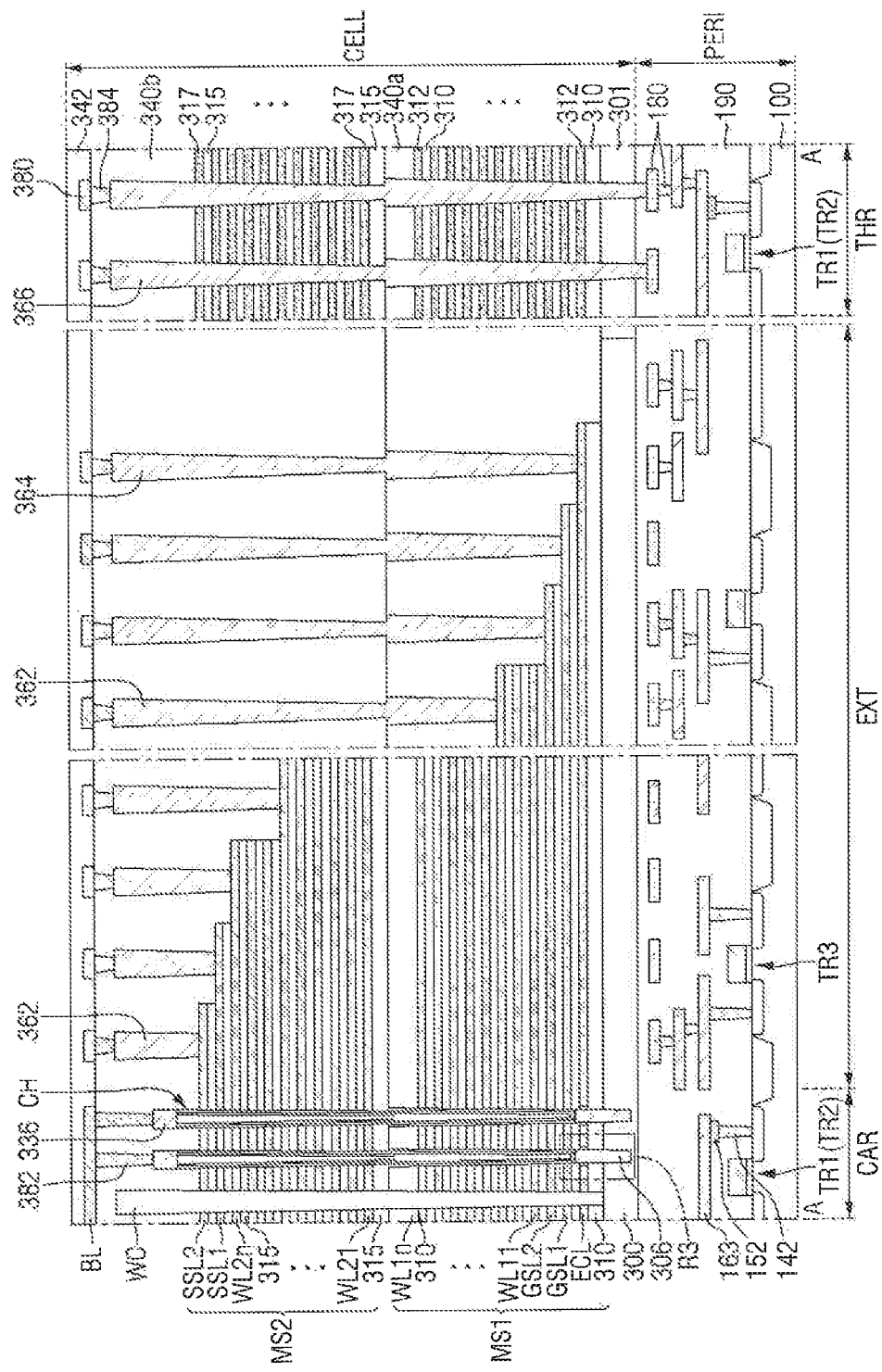
FIG. 16 is a cross-sectional view for illustrating a non-volatile memory device including a semiconductor device according to an exemplary embodiment of the present inventive concept.
Figure 17:
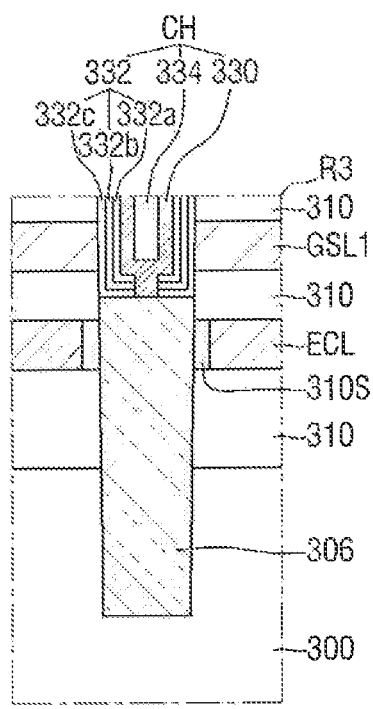
FIG. 17 is an enlarged view to illustrate the R3 area of FIG. 16.

FIG. 16 is a cross-sectional view for illustrating a non-volatile memory device including a semiconductor device according to an exemplary embodiment of the present inventive concept. FIG. 17 is an enlarged view to illustrate the R3 area of FIG. 16. For convenience of illustration, elements and/or components described above with reference to FIGS. 1 to 15 may be briefly described or omitted.

Referring to FIG. 16 and FIG. 17, a non-volatile memory device including the semiconductor device according to an exemplary embodiment of the present inventive concept includes a second source structure 306.

The second source structure 306 may be formed on the second substrate 300. Although a bottom of the second source structure 306 is shown to be disposed in the second substrate 300, this is only an example. The second source structure 306 may be connected to the semiconductor pattern 330 of the channel structure CH. For example, the semiconductor pattern 330 may extend through the information storage film 332 and contact an upper surface of the second source structure 306. The second source structure 306 may be formed using, for example, a selective epitaxial growth process from the second substrate 300. However, the present inventive concept is not limited thereto.

In an exemplary embodiment of the present inventive concept, an upper surface of the second source structure 306 may intersect some of the gate electrodes ECL, GSL1, GSL2, WL11 to WL1n, WL21 to WL2n, SSL1, and SSL2. In one example, a vertical level of the upper surface of the second source structure 306 may be higher than that of an upper surface of the erase control line ECL. In this case, a gate insulating film 310S may be interposed between the second source structure 306 and the gate electrode (e.g., erase control line ECL) intersecting the second source structure 306.

Figure 18:
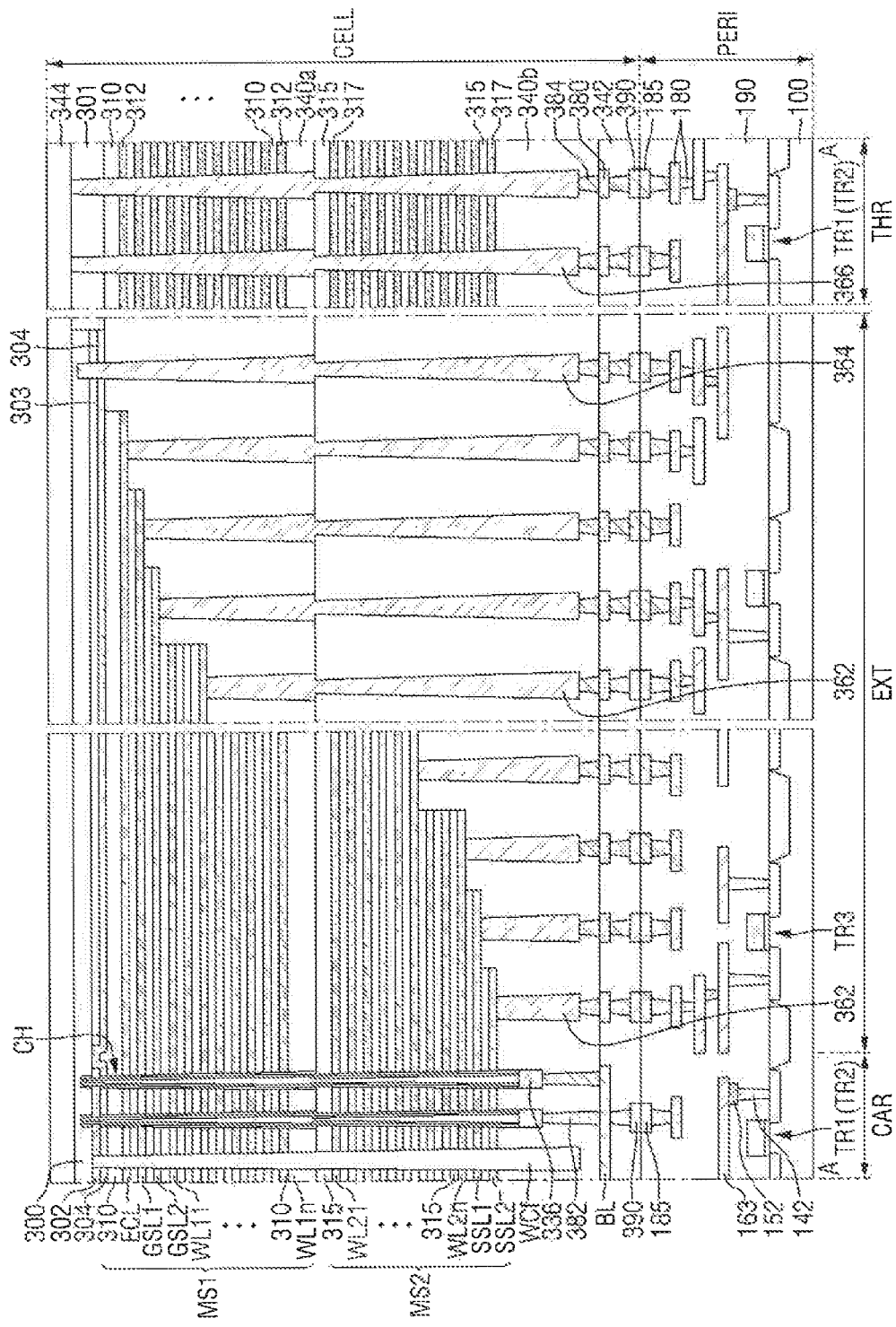
FIG. 18 is a cross-sectional view for illustrating a non-volatile memory device including a semiconductor device according to an exemplary embodiment of the present inventive concept.

FIG. 18 is across-sectional view for illustrating a non-volatile memory device including a semiconductor device according to an exemplary embodiment of the present inventive concept. For convenience of illustration, elements and/or components already described above with reference to FIGS. 1 to 15 may be briefly described or omitted.

Referring to FIG. 18, in a non-volatile memory device including a semiconductor device according to an exemplary embodiment of the present inventive concept, the front surface of the second substrate 300 faces the front surface of the first substrate 100.

For example, the non-volatile memory device according to an exemplary embodiment of the present inventive concept may have a chip to chip (C2C) structure. The C2C structure may refer to a structure in which an upper chip including the memory cell area CELL is disposed on a first wafer (e.g., the second substrate 300), and a lower chip including the peripheral circuit area PERI is disposed on a second wafer (e.g., the first substrate 100) different from the first wafer. In addition, the upper chip and the lower chip are connected to each other in a bonding scheme.

In one example, the bonding scheme may be a scheme for electrically connecting a first bonding metal 390 formed in an uppermost metal layer of the upper chip and a second bonding metal 185 formed in an uppermost metal layer of the lower chip to each other. For example, when each of the first bonding metal 390 and the second bonding metal 185 is made of copper (Cu), the bonding scheme may be embodied as a Cu—Cu bonding scheme. However, this is merely an example. In another example, each of the first bonding metal 390 and the second bonding metal 185 may be made of various other metals such as aluminum (Al) and/or tungsten (W).

Hereinafter, an electronic system including a semiconductor device according to an exemplary embodiment of the present inventive concept will be described with reference to FIGS. 1 to 21.

Figure 19:
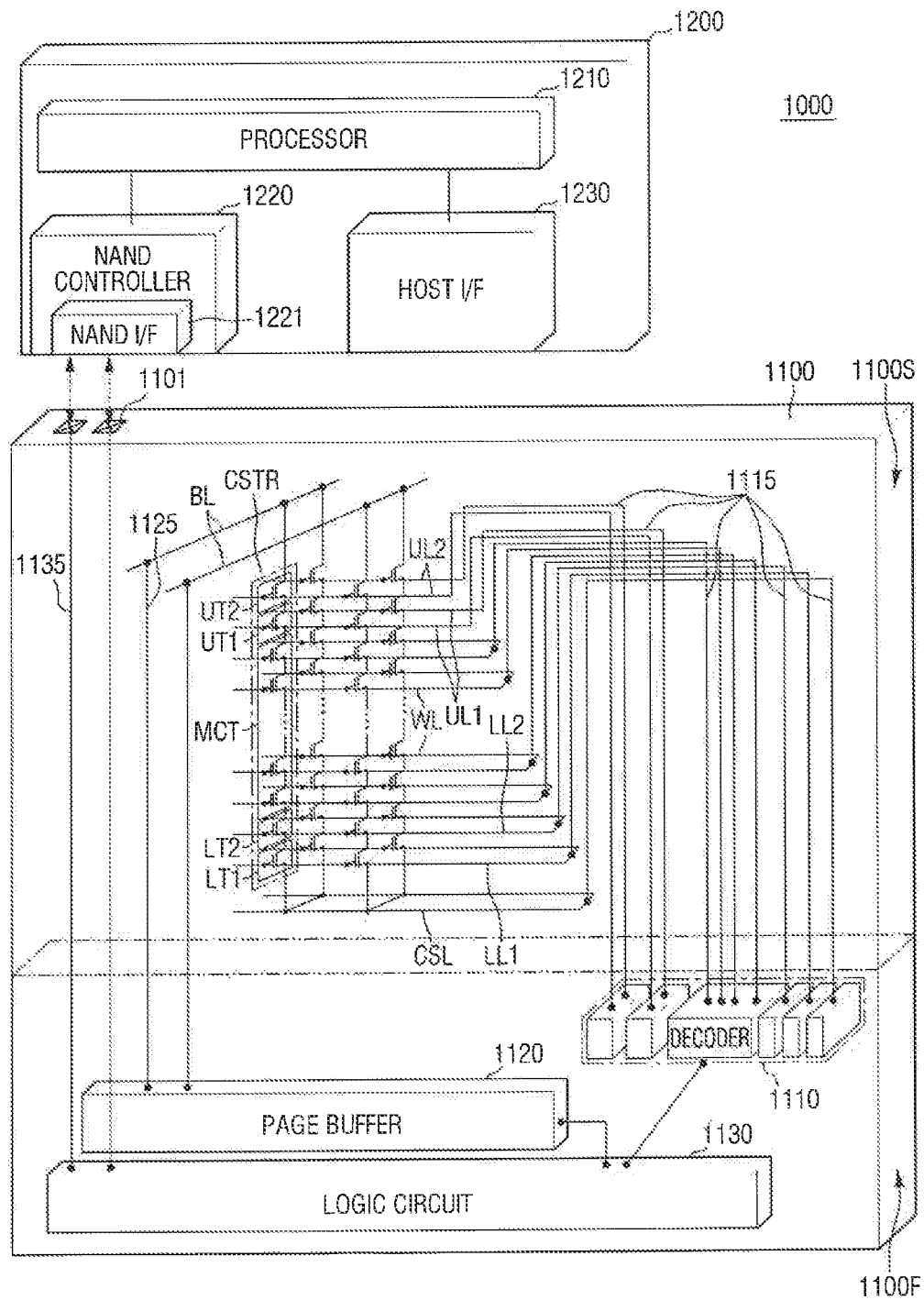
FIG. 19 is a schematic block diagram for illustrating an electronic system including a semiconductor device according to an exemplary embodiment of the present inventive concept.
Figure 20:
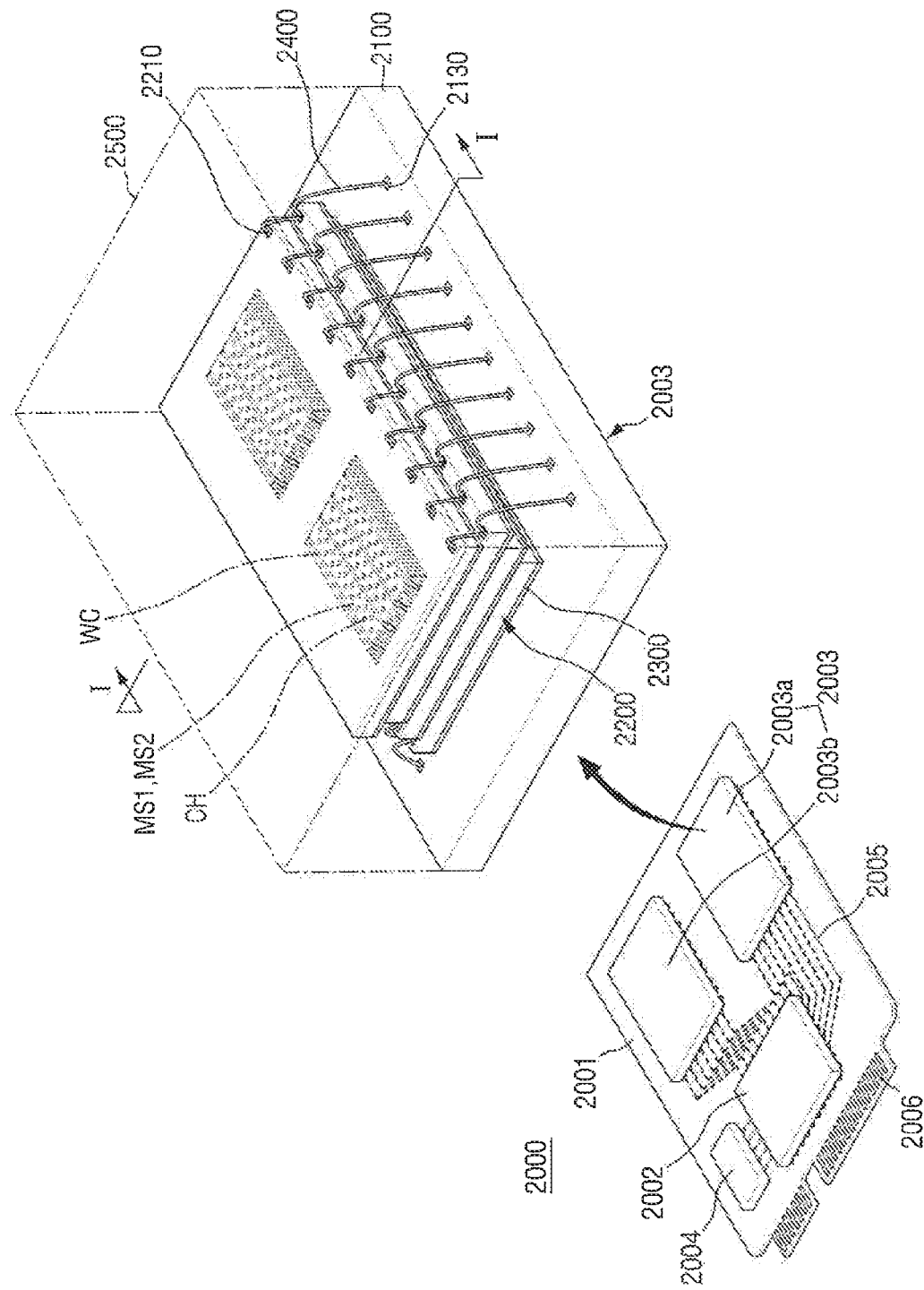
FIG. 20 is a schematic perspective view for illustrating an electronic system including a semiconductor device according to an exemplary embodiment of the present inventive concept.
Figure 21:
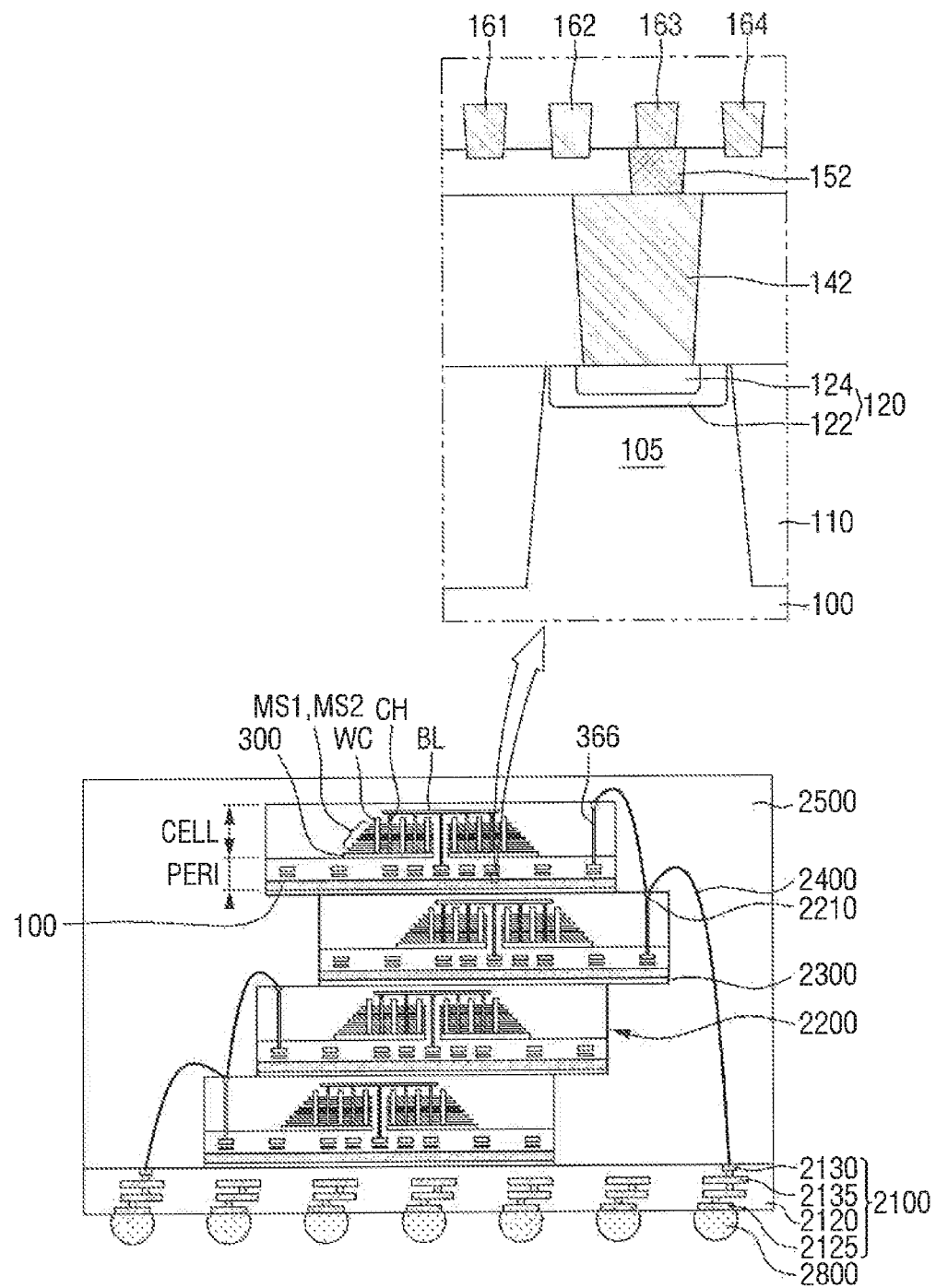
FIG. 21 is a schematic cross-sectional view taken along I-I of FIG. 20.

FIG. 19 is a schematic block diagram for illustrating an electronic system including a semiconductor device according to an exemplary embodiment of the present inventive concept. FIG. 20 is a schematic perspective view for illustrating an electronic system including a semiconductor device according to an exemplary embodiment of the present inventive concept. FIG. 21 is a schematic cross-sectional view taken along I-I of FIG. 20.

Referring to FIG. 19, an electronic system 1000 according to an exemplary embodiment of the present inventive concept may include a non-volatile memory device 1100 and a controller 1200 electrically connected to the non-volatile memory device 1100. The electronic system 1000 may be embodied as a storage device including one or a plurality of non-volatile memory devices 1100 or an electronic device including the storage device. For example, the electronic system 1000 may be embodied as a solid state drive device (SSD), a Universal Serial Bus (USB), a computing system, a medical device, or a communication device including one or a plurality of non-volatile memory devices 1100.

The non-volatile memory device 1100 may be embodied as a non-volatile memory device (e.g., a NAND flash memory device) and may include, for example, the non-volatile memory device as described above with reference to FIGS. 1 to 18. The non-volatile memory device 1100 may include a first structure 1100F and a second structure 1100S on the first structure 1100F.

The first structure 1100F may be a peripheral circuit structure including a row decoder circuit 1110 (for example, the row decoder circuit 33 in FIG. 1), the page buffer circuit 1120 (for example, the page buffer circuit 35 in FIG. 1), and a logic circuit 1130 (for example, the control logic circuit 37 of FIG. 1).

The second structure 1100S may include the common source line CSL, the plurality of bit-lines BL, and the plurality of cell strings CSTR. The cell strings CSTR may be connected to the decoder circuit 1110 via the word-line WL, at least one string select line SSL, and at least one ground select line GSL. Further, the cell strings CSTR may be connected to the page buffer circuit 1120 via the bit-lines BL.

In an exemplary embodiment of the present inventive concept, the common source line CSL and the cell strings CSTR may be electrically connected to the decoder circuit 1110 via first connection lines 1115 extending from the first structure 1100F to the second structure 1100S. The first connection line 1115 may correspond to some of the through-vias 166 as described above with reference to FIGS. 14 to 18.

In an exemplary embodiment of the present inventive concept, the bit-lines BL may be electrically connected to the page buffer circuit 1120 via second connection lines 1125 extending from the first structure 1100F to the second structure 1100S. The second connection line 1125 may correspond to the other of the through-vias 166 as described above with reference to FIGS. 1 to 12.

The non-volatile memory device 1100 may communicate with the controller 1200 via an input/output pad 1101 electrically connected to the logic circuit 1130 (e.g., the control logic circuit 37 in FIG. 1). The input/output pad 1101 may be electrically connected to the logic circuit 1130 via an input/output connection line 1135 extending from the first structure 1100F to the second structure 1100S.

The controller 1200 may include a processor 1210, a NAND controller 1220, and a host interface 1230. In an exemplary embodiment of the present inventive concept, the electronic system 1000 may include a plurality of non-volatile memory devices 1100. In this case, the controller 1200 may control the plurality of non-volatile memory devices 1100.

The processor 1210 may control overall operations of the electronic system 1000 including the controller 1200. The processor 1210 may operate based on predefined firmware, and may control the NAND controller 1220 to access the non-volatile memory device 1100. The NAND controller 1220 may include a NAND interface 1221 that processes communication with the non-volatile memory device 1100. Via the NAND interface 1221, a control command for controlling the non-volatile memory device 1100, data to be written to memory cell transistors MCT of the non-volatile memory device 1100, and data to be read from the memory cell transistors MCT of the non-volatile memory device 1100 may be transmitted. The host interface 1230 may provide a communication function between the electronic system 1000 and an external host. Upon receiving a control command from an external host via the host interface 1230, the processor 1210 may control the non-volatile memory device 1100 in response to the control command.

In an exemplary embodiment of the present inventive concept, the page buffer circuit 1120 may include the semiconductor device as described above with reference to FIGS. 1 to 13. In one example, the first structure 1100F may include the transistors TR1 and TR2 as described above with reference to FIGS. 4 to 8. The electronic system including the semiconductor device according to an exemplary embodiment of the present inventive concept may control the peripheral circuit elements (e.g., TR1, TR2, and TR3 of FIG. 14) of the non-volatile memory device 1100 using the controller 1200.

Referring to FIG. 20 and FIG. 21, an electronic system according to an exemplary embodiment of the present inventive concept may include a main substrate 2001, a main controller 2002 mounted on the main substrate 2001, at least one semiconductor package 2003 and at least one DRAM 2004. The semiconductor package 2003 and the DRAM 2004 may be connected to the main controller 2002 via line patterns 2005 formed on the main substrate 2001.

The main substrate 2001 may include a connector 2006 including a plurality of pins coupled to an external host. The number and an arrangement of the plurality of pins in the connector 2006 may vary based on a communication interface between the electronic system 2000 and the external host. In an exemplary embodiment of the present inventive concept, the electronic system 2000 may communicate with the external host using one of interfaces such as USB (Universal Serial Bus), PCI-Express (Peripheral Component Interconnect Express), SATA (Serial Advanced Technology Attachment), M-Phy for UFS (Universal Flash Storage), etc. In an exemplary embodiment of the present inventive concept, the electronic system 2000 may operate using power supplied from the external host via the connector 2006; however, the present inventive concept is not limited thereto. The electronic system 2000 may further include a power management integrated circuit (PMIC) for distributing power supplied from the external host to the main controller 2002 and the semiconductor package 2003.

The main controller 2002 may write data to the semiconductor package 2003 or read data from the semiconductor package 2003. In addition, the main controller 2002 may increase an operating speed of the electronic system 2000.

The DRAM 2004 may act as a buffer memory for reducing a difference between operation speeds of the semiconductor package 2003 as a data storage space and the external host. The DRAM 2004 included in electronic system 2000 may operate as a cache memory, and may provide a space for temporarily storing data therein in a control operation of the semiconductor package 2003. When the DRAM 2004 is included in the electronic system 2000, the main controller 2002 may further include a DRAM controller for controlling the DRAM 2004 in addition to a NAND controller for controlling the semiconductor package 2003.

The semiconductor package 2003 may include a first semiconductor package 2003a and a second semiconductor package 2003b spaced apart from each other. Each of the first semiconductor package 2003a and the second semiconductor package 2003b may be embodied as a semiconductor package including a plurality of semiconductor chips 2200. Each of the first semiconductor package 2003a and the second semiconductor package 2003b may include a package substrate 2100, semiconductor chips 2200 on the package substrate 2100, adhesive layers 2300 disposed on a bottom surface of each of the semiconductor chips 2200, a connection structure 2400 electrically connecting the semiconductor chips 2200 and the package substrate 2100 to each other, and a molding layer 2500 disposed on the package substrate 2100 and covering the semiconductor chips 2200 and the connection structure 2400.

The package substrate 2100 may be embodied as a printed circuit board including package upper pads 2130. Each semiconductor chip 2200 may include an input/output pad 2210. The input/output pad 2210 may correspond to the input/output pad 1101 of FIG. 19.

In an exemplary embodiment of the present inventive concept, the connection structure 2400 may be embodied as a bonding wire that electrically connects the input/output pad 2210 of the semiconductor chip 2200 and the package upper pads 2130 of the package substrate 2100 to each other. Accordingly, in each of the first semiconductor package 2003a and the second semiconductor package 2003b, the semiconductor chips 2200 may be electrically connected to each other in a bonding wire scheme, and may be electrically connected to the package upper pads 2130 of the package substrate 2100. In an exemplary embodiment of the present inventive concept, in each of the first semiconductor package 2003a and the second semiconductor package 2003b, the semiconductor chips 2200 may be electrically connected to each other via a connection structure including a through electrode (Through Silicon Via: TSV) instead of the connection structure 2400 using the bonding wire scheme.

In an exemplary embodiment of the present inventive concept, the main controller 2002 and the semiconductor chips 2200 may be included in one package. In an exemplary embodiment of the present inventive concept, the main controller 2002 and the semiconductor chips 2200 may be mounted on a separate interposer substrate different from the main substrate 2001, and the main controller 2002 and the semiconductor chips 2200 may be connected to each other via a line formed in the interposer substrate.

In an exemplary embodiment of the present inventive concept, the package substrate 2100 may be embodied as a printed circuit board. The package substrate 2100 may include a package substrate body 2120, the package upper pads 2130 disposed on an upper surface of the package substrate body 2120, package lower pads 2125 disposed on a bottom surface or exposed through the bottom surface of the package substrate body 2120, and internal lines 2135 disposed in the package substrate body 2120 so as to electrically connect the upper pads 2130 and the lower pads 2125 to each other. The package upper pads 2130 may be electrically connected to the connection structures 2400. The package lower pads 2125 may be connected to the line patterns 2005 of the main substrate 2001 of the electronic system 2000 as shown in FIG. 20 via conductive connections 2800.

In the electronic system according to an exemplary embodiment of the present inventive concept, each of the semiconductor chips 2200 may include the non-volatile memory device as described above with reference to FIGS. 14 to 18. For example, each of the semiconductor chips 2200 may include the peripheral circuit area PERI and the memory cell area CELL stacked on the peripheral circuit area PERI as described above with reference to FIGS. 14 to 18.

In the electronic system according to an exemplary embodiment of the present inventive concept, each of the semiconductor chips 2200 may include the semiconductor device as described above with reference to FIGS. 4 to 13. For example, each of the semiconductor chips 2200 may include the transistors TR1 and TR2, the lower contacts 142 and 144, the upper contacts 152 and 154, and the conductive lines 161 to 164 as described above with reference to FIGS. 4 to 13.

While the present inventive concept has been described with reference to exemplary embodiments thereof, it will be understood by those of ordinary skill in the art that various changes in form and details may be made thereto without departing from the spirit and scope of the present inventive concept.

What is claimed is:
1. A semiconductor device comprising:
   a substrate includes an active area formed therein;
   a gate structure disposed on the substrate and intersecting the active area;

a source/drain area disposed on the active area and on a side surface of the gate structure;

a first lower contact disposed on one of the source/drain area or the gate structure;

a first upper contact disposed on the first lower contact; and a plurality of conductive lines disposed on the first upper contact, wherein the plurality of conductive lines extend in a first direction parallel to an upper surface of the substrate, wherein the plurality of conductive lines includes a first conductive line disposed on the first upper contact, wherein a size in the first direction of the first lower contact is smaller than a size in the first direction of the first upper contact, wherein a size in a second direction of the first lower contact is greater than a size in the second direction of the first upper contact, wherein the second direction is parallel to the upper surface of the substrate and intersects the first direction.

2. The semiconductor device of claim 1, wherein the size in the second direction of the first upper contact is greater than a width in the second direction of each of the conductive lines.

3. The semiconductor device of claim 1, wherein the first lower contact and the first upper contact intersect each other.

4. The semiconductor device of claim 1, wherein a height of the first lower contact is greater than a height of the first upper contact.

5. The semiconductor device of claim 1, wherein the plurality of conductive lines further includes a second conductive line adjacent to the first conductive line, wherein a portion of the first lower contact overlaps a portion of the second conductive line in a third direction intersecting the first and second directions.

6. The semiconductor device of claim 5, wherein the first upper contact does not overlap the second conductive line in the third direction.

7. The semiconductor device of claim 1, wherein the active area extends in the first direction, wherein the gate structure extends in the second direction.

8. The semiconductor device of claim 1, wherein the device further comprises:

a second lower contact in contact with the other of the source/drain area and the gate structure; and a second upper contact disposed on the second lower contact and in contact with the second lower contact, wherein the plurality of conductive lines further includes a second conductive line in contact with the second upper contact, wherein a size in the first direction of the second upper contact is greater than a size in the first direction of the second lower contact, wherein a size in the second direction of the second lower contact is greater than a size in the second direction of the second upper contact.

9. The semiconductor device of claim 8, wherein the size in the second direction of the second upper contact is greater than a width in the second direction of each of the conductive lines.

10. The semiconductor device of claim 1, wherein a long side of the first lower contact extends in the second direction, wherein a long side of the first upper contact extends in the first direction.

11. A non-volatile memory device comprising:

a cell substrate;

a plurality of word-lines disposed on the cell substrate, spaced apart from each other, and sequentially stacked on the cell substrate;

a plurality of channel structures disposed on the cell substrate and intersecting the plurality of word-lines;

a plurality of bit-lines connected to at least one of the plurality of channel structures; and a page buffer circuit disposed on a peripheral circuit substrate and electrically connected to the plurality of bit-lines, wherein the page buffer circuit includes:

a transistor structure disposed on the peripheral circuit substrate;

a lower contact in contact with the transistor structure;

an upper contact disposed on the lower contact; and a plurality of conductive lines disposed on the upper contact, wherein the plurality of conductive lines extend in a first direction parallel to an upper surface of the substrate, and are connected the plurality of bit-lines, wherein at least one of the plurality of conductive lines is in contact with the upper contact, wherein a size in the first direction of the lower contact is smaller than a size in the first direction of the upper contact, wherein a size in a second direction of the lower contact is greater than a size in the second direction of the upper contact, wherein the second direction is parallel to the upper surface of the substrate and intersects the first direction.

12. The non-volatile memory device of claim 11, wherein the plurality of conductive lines includes a first conductive line and a second conductive line, wherein the first conductive line is in contact with the upper contact, and the second conductive line is adjacent to the first conductive line and not in contact with the upper contact, wherein, the lower contact extends in the second direction and across the first conductive line and the second conductive line.

13. The non-volatile memory device of claim 11, wherein each of the bit-lines extends in the first direction.

14. The non-volatile memory device of claim 13, wherein a pitch between adjacent ones of the plurality of conductive lines is greater than a pitch between adjacent ones of the plurality of bit-lines.

15. The non-volatile memory device of claim 14, wherein the pitch between adjacent ones of the plurality of conductive lines is twice the pitch between adjacent ones of the plurality of bit-lines.

16. The non-volatile memory device of claim 11, further comprising a word-line cutting area extending in the second direction and cutting the plurality of word-lines.

17. The non-volatile memory device of claim 11, wherein the cell substrate is stacked on the peripheral circuit substrate.

18. An electronic system comprising:

a main substrate;

a non-volatile memory device disposed on the main substrate; and a controller disposed on the main substrate and electrically connected to the non-volatile memory device, wherein the non-volatile memory device includes:

a plurality of memory cell strings;

a bit-line connected to at least one of the plurality of memory cell strings; and a page buffer circuit electrically connected to the bit-line, wherein the controller is configured to control the page buffer circuit, wherein the page buffer circuit includes;
  a transistor structure;
  a first contact in contact with the transistor structure;
  a second contact disposed on the first contact; and
  a conductive line disposed on the second contact and extending in a first direction parallel to an upper surface of the substrate, wherein the conductive line is electrically connected to the bit-line,
  wherein a size in the first direction of the first contact is smaller than a size in the first direction of the second contact,
  wherein a size in a second direction of the first contact is greater than a size in the second direction of the second contact, wherein the second direction is parallel to the upper surface of the substrate and intersects the first direction.

19. The electronic system of claim 18, wherein the first contact and the second contact intersect each other.

20. The electronic system of claim 18, wherein the bit-line extends in the first direction.

\* \* \* \* \*